(12) United States Patent
Nagatsu et al.

(10) Patent No.: US 8,838,364 B2
(45) Date of Patent: Sep. 16, 2014

(54) CONTROL DEVICE OF SPARK-IGNITION GASOLINE ENGINE

(75) Inventors: Kazuhiro Nagatsu, Hiroshima (JP); Masahisa Yamakawa, Hiroshima (JP); Kouhei Iwai, Hiroshima (JP); Yoshihisa Nou, Hiroshima (JP); Noriyuki Ota, Hiroshima (JP); Kazutoyo Watanabe, Higashihiroshima (JP); Naoya Watanabe, Higashihiroshima (JP); Hiroyuki Kurita, Hiroshima (JP); Shuji Oba, Kariya (JP); Tatsuya Koga, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 439 days.

(21) Appl. No.: 13/368,278

(22) Filed: Feb. 7, 2012

(65) Prior Publication Data

US 2012/0216776 A1 Aug. 30, 2012

(30) Foreign Application Priority Data

Feb. 24, 2011 (JP) ................. 2011-038810

(51) Int. Cl.
*F02B 1/12* (2006.01)
*F02B 23/10* (2006.01)
*F02D 41/30* (2006.01)
*F02D 13/02* (2006.01)
*F02D 41/00* (2006.01)
*F02D 41/38* (2006.01)
*F02B 29/04* (2006.01)
*F02M 25/07* (2006.01)
*F02M 35/10* (2006.01)

(52) U.S. Cl.
CPC ......... *F02D 41/3041* (2013.01); *F02B 29/0437* (2013.01); *Y02T 10/47* (2013.01); *F02B 23/101* (2013.01); *F02M 25/0754* (2013.01); *Y02T 10/125* (2013.01); *F02M 25/0731* (2013.01); *F02M 25/0752* (2013.01); *F02M 35/10386* (2013.01); *F02M 35/10177* (2013.01); *Y02T 10/18* (2013.01); *F02D 13/0234* (2013.01); *F02B 29/0418* (2013.01); *F02D 41/0057* (2013.01); *F02D 13/0242* (2013.01); *F02D 13/0273* (2013.01); *F02B 1/12* (2013.01); *F02D 41/3836* (2013.01); *F02M 35/1038* (2013.01); *F02M 25/0728* (2013.01)
USPC ........... 701/104; 701/105; 123/636; 123/637; 123/457; 123/511; 123/294; 123/305

(58) Field of Classification Search
USPC .......... 701/104, 105; 123/294, 295, 305, 457, 123/458, 511, 512, 568.21, 636, 637
See application file for complete search history.

(56) References Cited

U.S. PATENT DOCUMENTS

| 7,747,379 | B2 * | 6/2010 | Kita ............................... 701/105 |
| 7,894,976 | B2 * | 2/2011 | Yun et al. ...................... 701/110 |
| 8,312,860 | B2 * | 11/2012 | Yun et al. ...................... 123/299 |
| 2007/0068466 | A1 * | 3/2007 | Kulzer ............................. 123/3 |
| 2009/0205612 | A1 * | 8/2009 | Wermuth et al. ......... 123/406.19 |
| 2009/0272362 | A1 * | 11/2009 | Yun et al. ...................... 123/295 |
| 2013/0213349 | A1 * | 8/2013 | Sellnau et al. ................ 123/295 |

FOREIGN PATENT DOCUMENTS

JP 2009-091994 A 4/2009

* cited by examiner

*Primary Examiner* — Erick Solis
(74) *Attorney, Agent, or Firm* — Alleman Hall McCoy Russell & Tuttle LLP

(57) ABSTRACT

A control device of a spark-ignition gasoline engine is provided. The control device includes a controller for operating the engine body by controlling at least a fuel injection valve, an ignition plug, and a fuel pressure variable mechanism. Depending on the engine load range, the controller sets the combustion mode to a compression-ignition mode or a spark-ignition mode. In each mode, the controller also controls the fuel pressure, and the timing of fuel injection and ignition. The controller may also performs external EGR control in each mode.

16 Claims, 16 Drawing Sheets

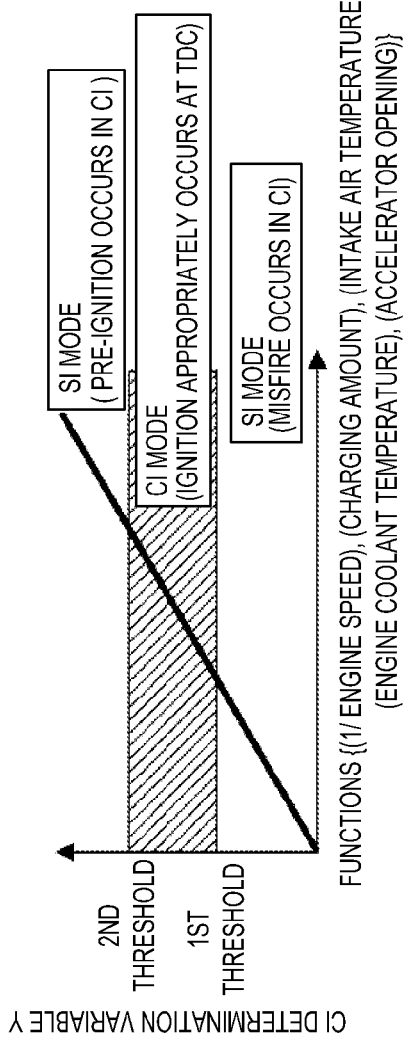
FIG. 16A
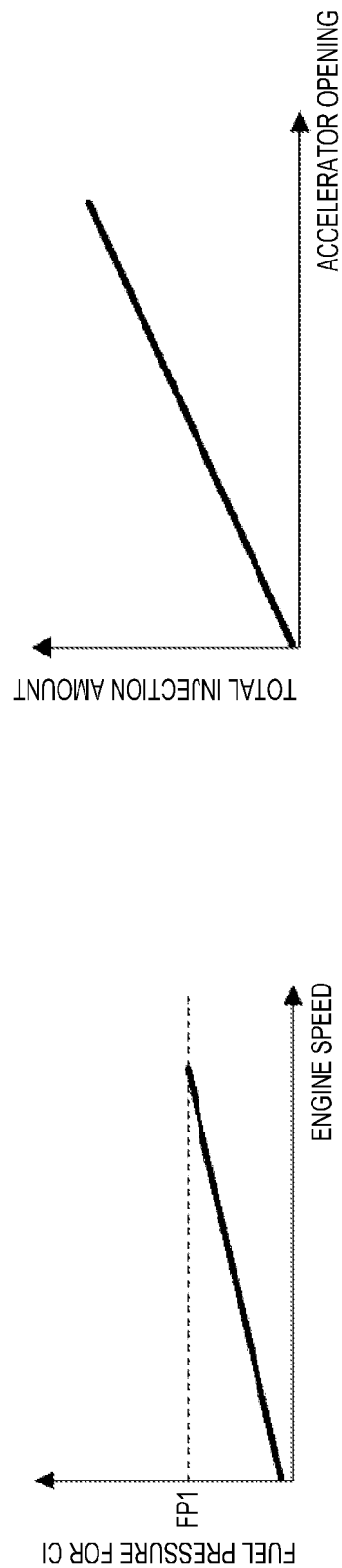
FIG. 16C
FIG. 16B

CONTROL DEVICE OF SPARK-IGNITION GASOLINE ENGINE

BACKGROUND

The present invention relates to a control device of a spark-ignition gasoline engine.

As an art of achieving both improvements in an exhaust emission and thermal efficiency, as disclosed in, for example, JP2009-091994A, an HCCI engine where a lean air-fuel mixture is compression-ignited has been known. However, as an engine load increases, a compression-ignition combustion turns into a combustion caused by a pre-ignition with a rapid pressure increase. Thereby, combustion noise increases and abnormal combustion, such as knocking, is caused, and further, an increase in Raw NOx due to a high combustion temperature is caused. Thus, with such an HCCI engine, the compression-ignition combustion is limited to be performed only within an operating range of the engine where the engine load is relatively low, and within an operating range of the engine where the engine load is relatively high, a spark-ignition combustion is generally performed by operating an ignition plug.

Meanwhile, the engine is operated at a leaner than theoretical air-fuel ratio to generate the compression-ignition combustion, whereas the engine is operated at the theoretical air-fuel ratio to perform the spark-ignition combustion. Therefore, in the case of the spark-ignition combustion, because an amount of fresh air is determined with respect to a fuel amount according to the engine load, an intake air charging amount needs to be reduced by, for example, a throttle control by a throttle valve. However, such a throttle control increases pumping loss, therefore the number of times the throttle control is performed is desired to be as small as possible. Whereas, introducing an external EGR gas into a cylinder can reduce the amount of fresh air without reducing the intake air charging amount. Therefore, adding the external EGR control in the case of the spark-ignition combustion is advantageous in reducing the pumping loss. Further, the introduction of the external EGR is advantageous in reducing cooling loss as well as beneficial in avoiding the abnormal combustion, such as the pre-ignition and knocking, and suppressing the generation of Raw NOx.

However, in view of stabilizing the combustion, the amount of the external EGR gas that can be introduced into the cylinder is controlled to be comparatively small. Thereby, there has been a problem that although, when the engine load is high and the fuel amount and the amount of fresh air are comparatively large, the intake air charging amount is not needed to be reduced due to the introduction of the external EGR gas, when the engine load is around the middle engine load and the fuel amount is comparatively small, such as near a boundary between an engine load range where the compression-ignition combustion is performed and an engine load range where the spark-ignition combustion is performed, even if a maximum amount of the external EGR gas is introduced, the amount of fresh air needs to be reduced by the throttle control and the pumping loss is hardly reduced.

The present invention is made in view of the above situations and narrows as much as possible, in a spark-ignition gasoline engine for switching mode between a compression-ignition mode in which a compression-ignition combustion is performed and a spark-ignition mode in which a spark-ignition combustion is performed, the engine load range where an intake air charging amount is needed to be reduced, by improving combustion stability in the spark-ignition mode.

It has been found that a characteristic fuel injection mode such that a fuel is injected into a cylinder with a comparatively high fuel pressure at a timing near a compression top dead center shortens the combustion period and, thereby, combustion stability improves. Thereby, this fuel injection mode enables a large amount of EGR gas to be introduced into the cylinder and, as a result, leads to the completion of the present invention.

MEANS FOR SOLVING THE PROBLEMS

According to one aspect of the invention, a control device of a spark-ignition gasoline engine is provided, which includes an engine body having a cylinder of which a geometric compression ratio is set to 14:1 or above, and being supplied with fuel containing at least gasoline, a fuel injection valve for injecting the fuel into the cylinder, an ignition plug arranged to be oriented inside the cylinder and for igniting air-fuel mixture within the cylinder, a fuel pressure variable mechanism for changing a pressure of the fuel that is injected by the fuel injection valve, and a controller for operating the engine body by controlling at least the fuel injection valve, the ignition plug, and the fuel pressure variable mechanism.

When an operating state of the engine body is within a predetermined low engine load range, the controller sets a combustion mode to a compression-ignition mode in which a compression-ignition combustion is performed. When the operating state is within a high engine load range where the engine load is higher than the compression ignition mode, the controller sets the combustion mode to a spark-ignition mode in which the controller controls the fuel pressure variable mechanism so that the fuel pressure is higher than that within a lower-half engine load range of the compression-ignition mode, the controller also operates the fuel injection valve to perform at least a fuel injection during a retard period from the late stage of compression stroke to the early stage of expansion stroke, and the controller also operates the ignition plug to ignite during the retard period and after the fuel injection.

When the operating state is within a range where the engine load is higher than a predetermined engine load of the spark-ignition mode, the controller performs an external EGR control of circulating a part of the burned gas back to an intake system of the engine body through an EGR passage, and the controller also controls an EGR ratio to be relatively high when the engine load is low in the spark-ignition mode. When the operating state is within a range where the engine load is below the predetermined load of the spark-ignition mode, the controller performs the external EGR control while setting the EGR ratio higher than that within the range where the engine load is higher than the predetermined engine load, and also performs a charging amount control of reducing an intake air charging amount to be less than in the compression-ignition mode.

Here, the geometric compression ratio of the engine body may be set to be within a range of 14:1 to, for example, 20:1.

Further, the "low engine load range" and the "high engine load range" may be, in a case where an operating range of the engine body is divided into two according to the level of the engine load, a lower-half engine load range and a higher-half engine load range, respectively.

The "low engine speed range" may be either, in a case where the operating range of the engine body is divided into two according to the level of the engine speed, a lower-half engine speed range, or, in a case where the operating range of the engine body is divided into three: the low, middle and high engine speed ranges, the low engine speed range.

The "late stage of the compression stroke" may be, in a case where the compression stroke is divided into three: the early, middle and late stages, the late stage, and similarly, the "early stage of the expansion stroke" may be, in a case where the expansion stroke is divided into three: the early, middle and late stages, the early stage.

First, when the operating state of the engine body is within the predetermined low engine load range, the combustion mode is in the compression-ignition mode where the compression-ignition combustion is performed. Compression-ignition combustion is advantageous in both improvements of exhaust emission and thermal efficiency. Especially, because the geometric compression ratio of the engine body in the above configuration is set to 14:1 or above, a temperature and a pressure inside the cylinder at the end of the compression stroke are high, and therefore, the engine body is advantageous in stabilizing the compression-ignition combustion. Note that, in the compression-ignition mode, the engine body may be operated at a leaner than theoretical air-fuel ratio. Further, in the compression-ignition mode, the temperature of the engine body at the end of the compression stroke may be increased by performing an internal EGR control to stabilize the compression-ignition combustion.

On the other hand, when the operating state of the engine body is higher within the engine load range than the compression-ignition mode, the combustion mode is in the spark-ignition mode. Further, in the spark-ignition mode, the fuel pressure is increased to be higher than the fuel pressure at least within the lower-half engine load range of the compression-ignition mode. Accompanying the injection of the fuel into the cylinder with the high fuel pressure, turbulence inside the cylinder becomes strong and turbulence kinetic energy inside the cylinder increases. Moreover, the fuel injection is performed at least during the retard period from the late stage of the compression stroke to the early stage of the expansion stroke. The combination of high fuel pressure and the fuel injection at comparatively late timing shortens a combustion period of a combustion that is started by the ignition after the fuel injection.

That is, the higher turbulence kinetic energy inside the cylinder is advantageous to shortening the combustion period. Although the fuel injection with the high fuel pressure increases the turbulence kinetic energy inside the cylinder as described above, if the injection timing is during the intake stroke, the turbulence subsides due to a time length between the fuel injection and ignition timing being long and the inside of the cylinder being compressed during the compression stroke after the intake stroke, and the turbulence kinetic energy inside the cylinder during the combustion period becomes comparatively low. That is, even if the fuel is injected inside the cylinder with the high fuel pressure, as long as the injection timing is during the intake stroke, the fuel injection with the high fuel pressure does not contribute greatly to shortening the combustion period.

Whereas, as the above configuration, injecting the fuel inside the cylinder with the high fuel pressure at the timing during the retard period (that is, at a comparatively late timing), can start the combustion while suppressing the subsiding of the turbulence inside the cylinder. Therefore, the turbulence kinetic energy inside the cylinder during the combustion period increases. Thereby, the combustion period is shortened and the combustion can be stabilized.

Further, the high fuel pressure relatively increases an amount of the fuel to be injected per unit time. Therefore, when comparing with the same fuel injection amount, the high fuel pressure shortens a period of injecting the fuel inside the cylinder (that is, the injection period), compared to the case with the low fuel pressure.

Moreover, the high fuel pressure is advantageous in atomizing an atomized fuel injected inside the cylinder and also extends a spreading distance of the atomized fuel. Thus, the high fuel pressure shortens a period starting from when the fuel injection completes until a combustible air-fuel mixture is formed around the ignition plug (an air-fuel mixture forming period).

Therefore, shortening the injection period and the air-fuel mixture forming period as described above allows the injection timing of the fuel (more accurately, an injection start timing) to be at a comparatively late timing. That is, the high fuel pressure enables the fuel injection during the retard period.

Thus, in the spark-ignition mode, the fuel injection inside the cylinder is performed with high fuel pressure during the retard period. Thereby, a rapid combustion in which the combustion period is short is realized and leads to stabilized combustion.

Moreover, the external EGR control is performed in the spark-ignition mode. That is, by setting the EGR ratio relatively high within the range where the engine load is higher than the predetermined engine load and when the engine load is relatively low therein, the engine load control by which the amount of fresh air to be introduced inside the cylinder is reduced when the engine load is low is performed. Here, as described above, in the spark-ignition mode, because high combustion stability is obtained, an amount of EGR gas larger than in the conventional case can be introduced into the cylinder. The introduction of a large amount of the EGR gas enables, to the extent of the engine load range lower than the conventional case, the engine load control only by the external EGR control without reducing the intake air charging amount.

Thus, within the range where the engine load is further decreased (in other words, the range where the engine load is below the predetermined engine load), the charging amount control by which the intake air charging amount control is reduced to be less than in the compression-ignition mode is performed together with the external EGR control. As described above, because engine load control only by the external EGR control can be performed at a lower engine load range than in the conventional approach, the engine load range where the charging amount is needed to be reduced (i.e., the range below the predetermined engine load) is smaller than in the conventional approach. Further, because a larger amount of EGR gas larger than is conventional is introduced into the cylinder, the air charging amount may be reduced to be smaller, to a degree corresponding to the increased EGR gas amount. As a result, the pumping loss is suppressed and fuel consumption improves. Moreover, the external EGR control is advantageous in reducing cooling loss, avoiding abnormal combustion, and suppressing a generation of Raw NOx, respectively. Therefore, increasing the EGR ratio higher than in the conventional case leads to further increases in all of the above effects.

In the spark-ignition mode, the controller may operate the engine body at an air-fuel ratio $\lambda=1$.

The operation at the theoretical air-fuel ratio shortens the combustion period compared to the lean operation and, thereby becomes advantageous in stabilizing the combustion in the spark-ignition mode. Further, operating the engine body at the theoretical air-fuel ratio allows it to utilize a three-way catalyst. Thus, the operation at $\lambda=1$ is advantageous in improving emission performance in the spark-ignition mode.

In the spark-ignition mode, the fuel pressure variable mechanism may set the fuel pressure to 40 MPa or above.

The fuel pressure of 40 MPa or above effectively achieves the shortening of the combustion period as well as the injection period and the air-fuel mixture forming period. Note that, a maximum value of the fuel pressure can be set according to a kind of the fuel. For example, although it is not limited to this, the maximum value of the fuel pressure may be set to about 120 MPa.

Within the range where the engine load is below the predetermined engine load of the spark-ignition mode, the controller may set the EGR ratio to 30% or above.

Here, the EGR ratio (%) is defined as follows: the EGR ratio (%)=an EGR gas mass (g)/(a mass of the fresh air (g)+the EGR gas mass (g)), and the EGR ratio may be calculated from (a $CO_2$ concentration (%) inside an intake passage–a $CO_2$ concentration (%) within the atmosphere)/(a $CO_2$ concentration (%) within exhaust gas–a $CO_2$ concentration within the atmosphere).

By introducing a large amount of the EGR gas with which the EGR ratio becomes 30% or above, the engine load range where the charging amount control is needed is sufficiently narrowed as above. Note that, the EGR ratio may suitably be set within a range of, for example, 30 to 50%.

In the spark-ignition mode, the controller may operate the fuel injection valve to perform a plurality of fuel injections and set a timing of the final fuel injection among the plurality of fuel injections to be during the retard period.

A fuel injection performed at a relatively early timing among the plurality of fuel injections that are separately performed can secure a long air-fuel mixture forming period and, therefore, becomes advantageous in vaporizing and atomizing the fuel. Because such a sufficient air-fuel mixture forming period is secured, the fuel injection at a relatively late timing can be performed at a further retarded timing. This becomes advantageous in increasing the turbulence kinetic energy inside the cylinder and the combustion period is further shortened, that is, advantageous in stabilizing the combustion.

Within the range where the engine load is below the predetermined engine load of the spark-ignition mode, the controller may adjust the EGR ratio by performing a throttle control of a throttle valve that is provided within an intake passage.

By the throttle control of the throttle valve, a negative pressure applied within the intake passage on the downstream of the throttle valve increases. As a result, the EGR gas amount to be circulated back to the intake system of the engine body increases. That is, by using the throttle control of the throttle valve not for reducing the intake air charging amount but for adjusting the EGR ratio, the throttle control becomes advantageous in either one of reducing and avoiding the pumping loss.

The control device may further include a variable valve mechanism (VVL) for changing an actuation state of an exhaust valve. In the compression-ignition mode, the controller may adjust the EGR ratio by opening the exhaust valve twice during the exhaust stroke and the intake stroke, respectively.

As above, by performing the internal EGR control with the simple configuration and controlling the EGR amount, the temperature of the engine body at the end of the compression stroke can be adjusted.

In the compression-ignition mode (CI), a ratio of an amount of fresh air and an amount of EGR gas may be adjusted by fully opening a throttle valve that is provided within an intake passage, fully closing an EGR valve that is provided within the EGR passage, setting closing timings of an exhaust valve and an intake valve to predetermined constant timings, respectively, advancing an opening timing of the intake valve as the engine load increases, and increasing a lift of the intake valve corresponding to the increase of the engine load.

Thereby, stabilized compression-ignition combustion can be achieved by the internal EGR control.

In the spark-ignition mode (SI), a ratio of an amount of fresh air and an amount of EGR gas may be adjusted by keeping the throttle valve provided within the intake passage fully opened, setting opening and closing timings of an intake valve constant, keeping a lift of the intake valve at a maximum value, and adjusting an opening of an EGR valve that is provided within the EGR passage.

Thereby, this adjustment can be advantageous in reducing the pumping loss.

In the compression-ignition mode (CI), a ratio of an amount of fresh air and an amount of EGR gas may be adjusted by increasing an opening of a throttle valve that is provided within an intake passage corresponding to the increase of the engine load, fully closing an EGR valve that is provided within the EGR passage, setting closing timings of an exhaust valve and an intake valve to predetermined constant timings, respectively, setting an opening timing of the intake valve to be constant regardless of the engine load, and setting a lift of the intake valve to be constant regardless of the engine load.

The stabilized compression-ignition combustion can be achieved by the internal EGR control.

In the spark-ignition mode (SI), a switching range may be set within a middle engine load range relating to a switch to the compression-ignition mode. Within the switching range, a ratio of an amount of fresh air and an amount of EGR gas may be adjusted by throttling a throttle valve that is provided within an intake passage rather than a fully opened state, fully opening an EGR valve that is provided within the EGR passage, retarding a closing timing of an intake valve as the engine load increases, setting an opening timing of the intake valve and a closing timing of an exhaust valve constant, and keeping a lift of the intake valve at a maximum value.

Thereby, this adjustment can be advantageous in reducing the pumping loss.

The controller may calculate a knock variable and then calculate the fuel pressure in the spark-ignition mode (SI) based on the knock variable.

Thereby, the ease of occurrence of abnormal combustion is calculated. By adjusting the fuel pressure based on this calculated ease, abnormal combustion can be avoided.

The controller may calculate a knock variable and then calculate a ratio of the fuel injection during the retard period of the spark-ignition mode (SI) to a total injection amount based on the knock variable.

Thereby, the ease of occurrence of abnormal combustion is calculated. By adjusting the fuel injection ratio based on this calculated ease, abnormal combustion can be avoided.

The controller may calculate a knock variable and then calculate a retarding amount of the injection timing in the spark-ignition mode (SI) based on the knock variable.

Thereby, the ease of occurrence of abnormal combustion is calculated. By adjusting the injection timing based on this calculated ease, abnormal combustion can be avoided.

The controller may determine to switch the combustion mode to either one of the compression-ignition mode and the spark-ignition mode based on a determination variable that is calculated from an accelerator opening, an engine speed, a charging amount of intake air, an engine coolant temperature, and an intake air temperature.

A calculation of whether the air-fuel mixture compression-ignites near a compression top dead center and a determination to switch the combustion mode between the compression-ignition mode and the spark-ignition mode are performed. Thereby, a misfire and a pre-ignition can be avoided.

BRIEF DESCRIPTION OF THE DRAWINGS

FIGS. 16A-16G are characteristic charts of parameters calculated according to the flow in FIG. 15.

DETAILED DESCRIPTION OF THE EMBODIMENTS

Figure 1:
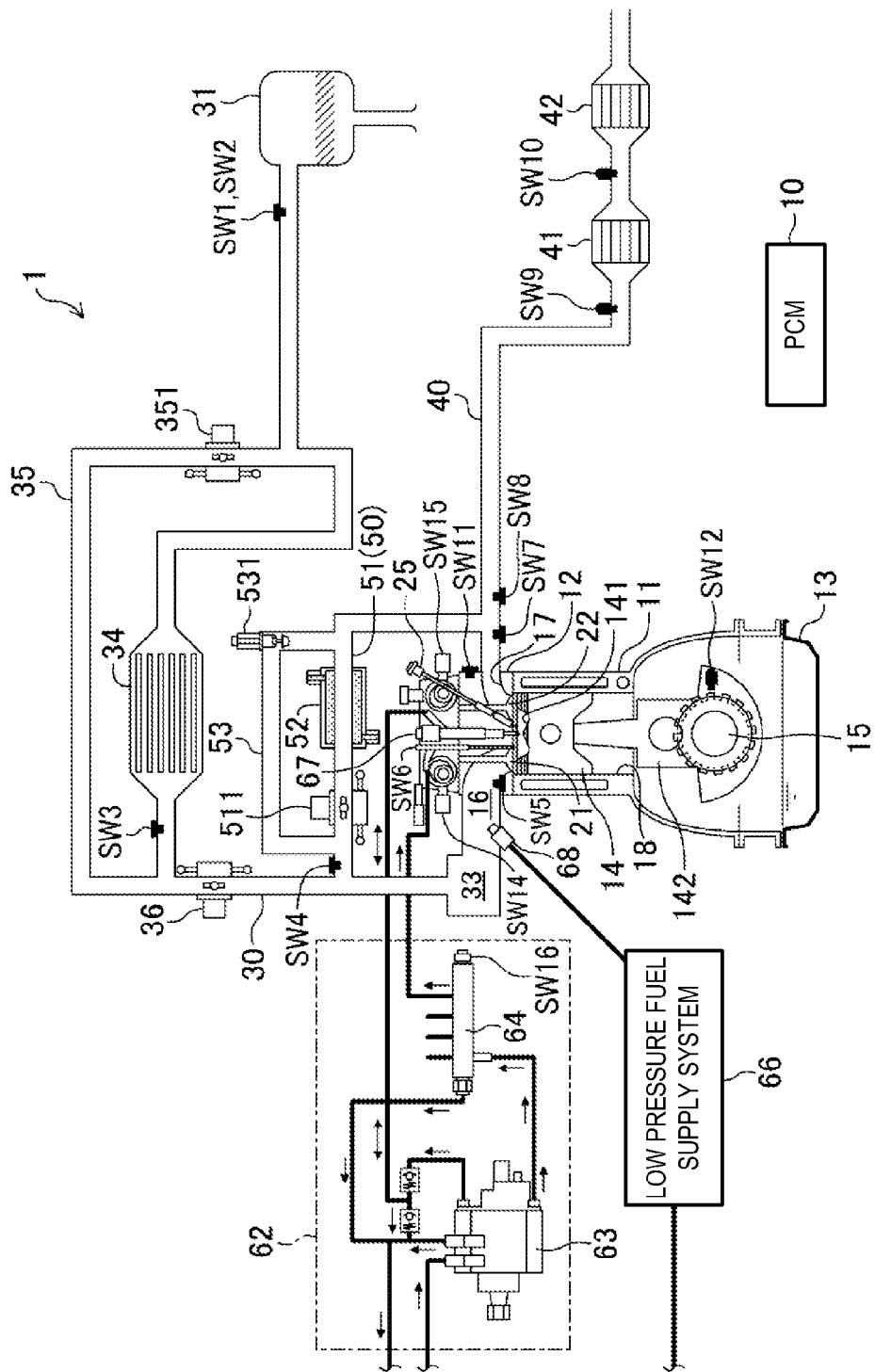
FIG. 1 is a schematic diagram showing a configuration of a spark-ignition gasoline engine.
Figure 2:
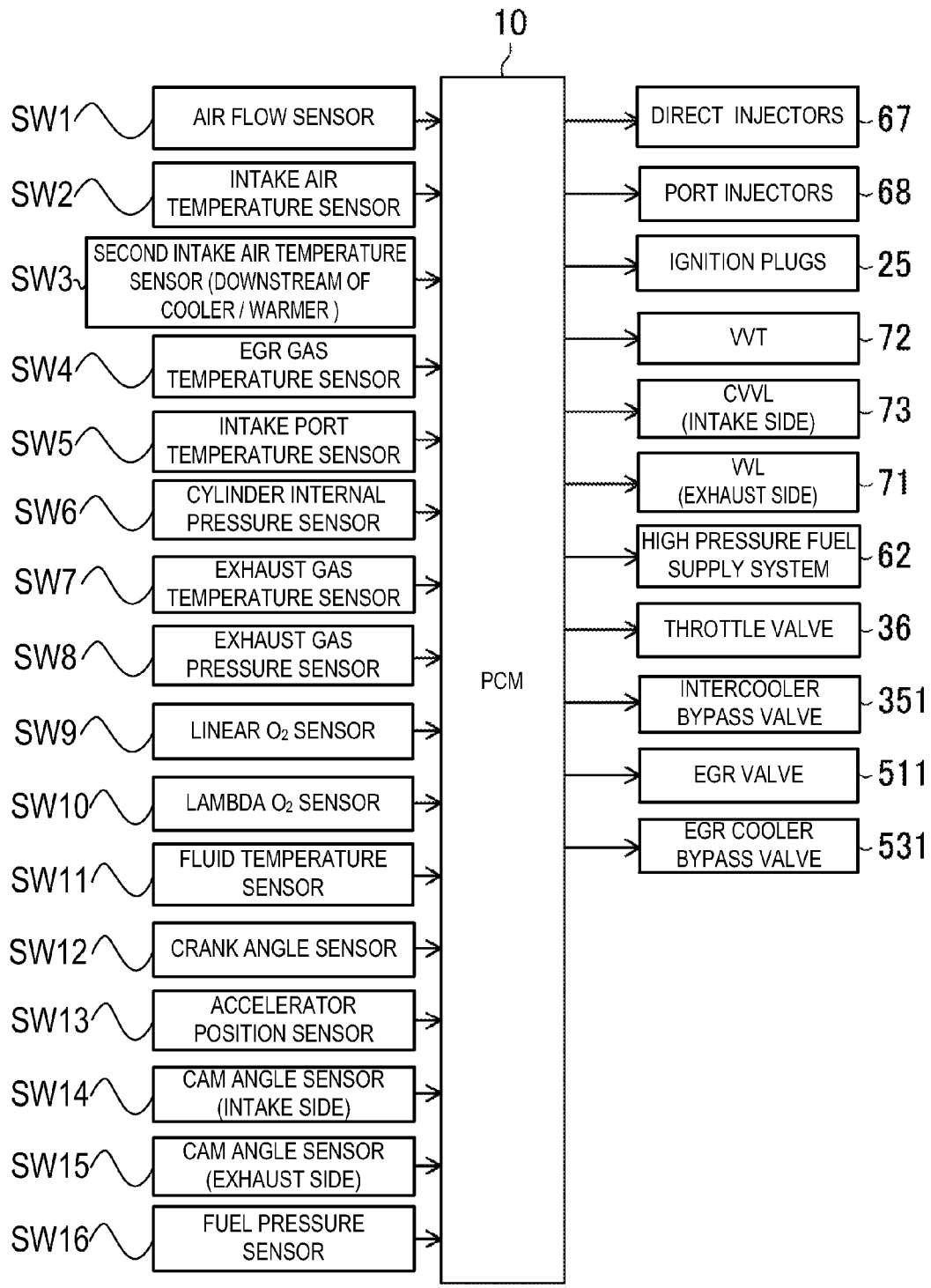
FIG. 2 is a block diagram relating to a control of the spark-ignition gasoline engine.
Figure 3:
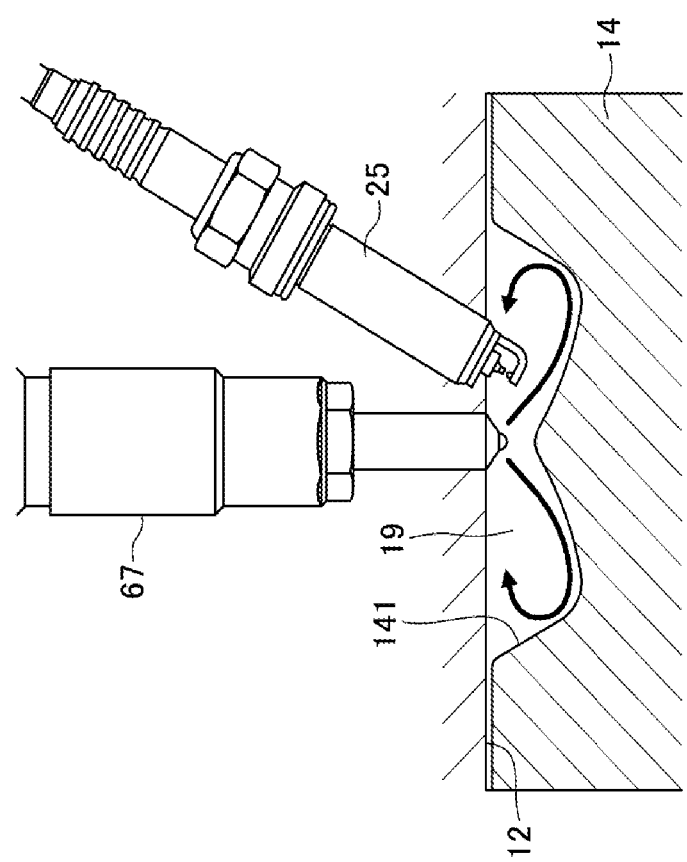
FIG. 3 is an enlarged cross-sectional view showing a combustion chamber.

Hereinafter, a control device of a spark-ignition gasoline engine according to an embodiment of the present invention is described in detail with reference to the appended drawings. The following description of the preferred embodiments is an illustration. FIGS. 1 and 2 show a schematic configuration of an engine 1 (engine body) of this embodiment. The engine 1 is a spark-ignition gasoline engine that is mounted in a vehicle and supplied with fuel containing at least gasoline. The engine 1 includes a cylinder block 11 provided with a plurality of cylinders 18 (only one cylinder is illustrated), a cylinder head 12 arranged on the cylinder block 11, and an oil pan 13 arranged below the cylinder block 11 where a lubricant is stored. Inside the cylinders 18, reciprocating pistons 14 coupled to a crank shaft 15 via connecting rods 142, respectively, are fitted. As shown in FIG. 3 in an enlarged manner, a cavity 141 in a reentrant shape is formed on a top face of each piston 14. When the piston 14 is at a position near a compression top dead center, the cavity 141 faces toward a direct injector 67 described later. The cylinder head 12, the cylinders 18, and the pistons 14 each formed with the cavity 141 partition the combustion chambers 19. Note that, the shape of the combustion chamber 19 is not limited to the shape in illustration. For example, the shape of the cavity 141, a shape of the top face of the piston 14, and a shape of a ceiling part of the combustion chamber 19 may suitably be changed.

A geometric compression ratio of the engine 1 is set comparatively high to be 14:1 or above so as to improve a theoretical thermal efficiency and stabilize a compression-ignition combustion (described later). Note that, the geometric compression ratio may suitably be set within a range of 14:1 to 20:1.

In the cylinder head 12, an intake port 16 and an exhaust port 17 are formed, and an intake valve 21 for opening and closing the opening of the intake port 16 on the combustion chamber 19 side and an exhaust valve 22 for opening and closing the opening of the exhaust port 17 on the combustion chamber 19 side are arranged for each of the cylinders 18.

Within a valve train system of the engine 1 for operating the intake and exhaust valves 21 and 22, a mechanism such as a hydraulically-actuated variable valve mechanism 71 (see FIG. 2, hereinafter, it may be referred to as the VVL (Variable Valve Lift)) for switching an operation mode of the exhaust valve 22 between a normal mode and a special mode is provided on an exhaust side. The VVL 71 (a detailed configuration is not illustrated) is configured to include two kinds of cams with cam profiles different from each other in which a first cam has one cam nose and a second cam has two cam noses; and a lost motion mechanism for selectively transmitting an operation state of either one of the first and second cams to the exhaust valve 22. When the lost motion mechanism transmits the operation state of the first cam to the exhaust valve 22, the exhaust valve 22 operates in the normal mode where it opens only once during exhaust stroke (see parts (c) and (d) in FIG. 10). On the other hand, when the lost motion mechanism transmits the operation state of the second cam to the exhaust valve 22, the exhaust valve 22 operates in a special mode where it opens during the exhaust stroke and further during the intake stroke once each, that is the exhaust valve opens twice in one cycle of the engine (see parts (a) and (b) in FIG. 10). The normal and special modes of the VVL 71 are switched therebetween according to an operating state of the engine. Specifically, the special mode is utilized for a control related to an internal EGR. Note that, an electromagnetically-operated valve system for operating the exhaust valve 22 by using an electromagnetic actuator may be adopted for switching between the normal and special modes. Further, the execution of the internal EGR is not limited to opening the exhaust valve 22 twice, and it may be accomplished through, for example, an internal EGR control by opening the intake valve 21 twice or through an internal EGR control where burned gas is left in the cylinder 18 by setting a negative overlap period where both of the intake and exhaust valves 21 and 22 are closed during the exhaust stroke or the intake stroke.

While the valve train system on the exhaust side is provided with the VVL 71, as shown in FIG. 2, a phase variable mechanism 72 (hereinafter, it may be referred as the VVT (Variable Valve Timing)) for changing a rotation phase of an intake camshaft with respect to the crank shaft 15 and a lift variable mechanism 73 (hereinafter, it may be referred as the CVVL (Continuously Variable Valve Lift) for continuously changing a lift of the intake valve 21 are provided on an intake side of the valve train system. A well-known hydraulic, electromagnetic or mechanical structure may suitably be adopted for the VVT 72 (a detailed structure is not illustrated). Further, various kinds of well-known structure may suitably be adopted for the CVVL 73 (a detailed structure is not illustrated). As shown in parts (a) to (d) in FIG. 10, opening and closing timings, and the lift of the intake valve 21 can be changed by the VVT 72 and the CVVL 73, respectively.

The direct injector 67 for directly injecting the fuel into the cylinder 18 and a port injector 68 for injecting the fuel into the intake port 16 are attached to the cylinder head 12, for each cylinder 18.

As shown in an enlarged manner in FIG. 3, a nozzle hole of the direct injector 67 is arranged in a center part of the ceiling surface of the combustion chamber 19 to be oriented toward the combustion chamber 19. The direct injector 67 directly injects the fuel into the combustion chamber 19 by an amount according to the operating state of the engine 1 at an injection timing according to the operating state of the engine 1. In this embodiment, the direct injector 67 (a detailed configuration is omitted) is a multi-hole injector formed with a plurality of nozzle holes. Thereby, the direct injector 67 injects the fuel so that the atomized fuel spreads radially. As indicated by the arrows in FIG. 3, at a timing corresponding to the piston 14 reaching the position near the compression top dead center, the atomized fuel injected from the center part of the combustion chamber 19 to spread radially flows along a wall surface of the cavity 141 formed on the piston top face, and, thereby, the atomized fuel reaches around an ignition plug 25 described later. Therefore, it may be said that the cavity 141 is formed to accommodate the atomized fuel injected at the timing corresponding to the position of the piston 14 reaching the position near the compression top dead center therewithin. The combination of the multi-hole injector 67 and the cavity 141 is advantageous in shortening a time length from the injection of the fuel until when the atomized fuel reaches around the ignition plug 25, and advantageous in shortening the combustion period. Note that, the direct injector 67 is not limited to the multi-hole injector, and an outward opening valve type injector may be adopted to the direct injector 67.

As shown in FIG. 1, the port injector 68 is arranged to be oriented toward the intake port 16 or an independent passage communicating with the intake port 16 and injects the fuel into the intake port 16. One port injector 68 may be provided for each cylinder 18 or, if the intake port 16 includes two intake ports for each cylinder 18, the port injector 68 may be provided for each of the two intake ports 16. A type of the port injector 68 is not limited to a particular type, and various types of injectors may suitably be adopted.

A high pressure fuel supply path couples between a fuel tank (provided in a position out of the range in the illustration) and the direct injectors 67. A high pressure fuel supply system 62, having a high pressure fuel pump 63 and a common rail 64, for supplying the fuel to each of the direct injectors 67 with a relatively high fuel pressure is provided within the high pressure fuel supply path. The high pressure fuel pump 63 pumps the fuel from the fuel tank to the common rail 64, and the common rail 64 accumulates the pumped fuel with a high fuel pressure. By opening the nozzle holes of the direct injector 67, the fuel accumulated in the common rail 64 is injected from the nozzle holes of the direct injector 67. Here, the high pressure fuel pump 63 (the illustration thereof is omitted in the drawings) is a plunger type pump and, by being coupled to, for example, a timing belt between the crank shaft and the camshaft, is operated by the engine 1. The high pressure fuel supply system 62 including the engine-operated pump enables the supply of fuel with a high fuel pressure, that is, 40 MPa or above, to the direct injector 67. As described later, the pressure of the fuel to be supplied to the direct injector 67 is changed according to the operating state of the engine 1. Note that, the high pressure fuel supply system 62 is not limited to the above configuration.

Similarly, a low pressure fuel supply path couples between the fuel tank (provided in a position out of the range in the illustration) and the port injectors 68. A low pressure fuel supply system 66 for supplying the fuel with a relatively low fuel pressure to each of the port injectors 68 is provided within the low pressure fuel supply path. The low pressure fuel supply system 66 (the illustration thereof is omitted in the drawings) includes an electrically-operated or engine-operated low pressure fuel pump and a regulator, and is configured to supply the fuel with a predetermined pressure to the port injector 68. The port injector 68 injects the fuel to the intake port, and therefore the pressure of the fuel that is supplied from the low pressure fuel supply system 66 is set lower than the pressure of the fuel that is supplied from the high pressure fuel supply system 62.

Further, in the cylinder head 12, the ignition plug 25 for igniting the air-fuel mixture inside the combustion chamber 19 is attached to each cylinder 18. The ignition plug 25 is attached penetrating the cylinder head 12 so as to extend obliquely downward from the exhaust side of the engine 1. As shown in FIG. 3, a tip of the ignition plug 25 is oriented in proximity to a tip of the direct injector 67 oriented in the center part of the combustion chamber 19, and oriented toward the combustion chamber 19.

On one side surface of the engine 1, an intake passage 30 is connected to communicate with each of the intake ports 16 of the cylinders 18. On the other side of the engine 1, an exhaust passage 40 for discharging the burned gas (exhaust gas) from each of the combustion chambers 19 of the cylinders 18 is connected.

An air cleaner 31 for filtrating intake air is arranged in an upstream end part of the intake passage 30. A surge tank 33 is arranged near a downstream end of the intake passage 30. A part of the intake passage 30 on the downstream side of the surge tank 33 is branched to be independent passages extending toward the respective cylinders 18, and downstream ends of the independent passages are connected with the intake ports 16 of the cylinders 18, respectively.

A water-cooled type intercooler/warmer 34 for cooling or heating air and a throttle valve 36 for adjusting an intake air amount to each cylinder 18 are arranged between the air cleaner 31 and the surge tank 33 in the intake passage 30. Further, an intercooler/warmer bypass passage 35 for bypassing the intercooler/warmer 34 is connected within the intake passage 30, and an intercooler bypass valve 351 for adjusting an air flow rate passing through the passage 35 is arranged within the intercooler/warmer bypass passage 35. A ratio of a flow rate through the intercooler/warmer bypass passage 35 and a flow rate through the intercooler/warmer 34 are adjusted through adjusting an opening of the intercooler bypass valve 351, and thereby, a temperature of fresh air to be introduced into the cylinder 18 is adjusted.

A part of the exhaust passage 40 on the upstream side is constituted with an exhaust manifold having independent passages branched toward the cylinders 18, respectively, and connected with outer ends of the exhaust ports 17 and a merging part where the independent passages merge together. In a part of the exhaust passage 40 on the downstream of the exhaust manifold, a direct catalyst 41 and an underfoot catalyst 42 are connected as an exhaust emission control system for purifying hazardous components contained in the exhaust gas. Each of the direct catalyst 41 and the underfoot catalyst 42 includes a cylinder case and, for example, a three-way catalyst arranged in a flow passage within the case.

A part of the intake passage 30 between the surge tank 33 and the throttle valve 36 and a part of the exhaust passage 40 on the upstream of the direct catalyst 41 are connected with each other via an EGR passage 50 for re-circulating a part of the exhaust gas to the intake passage 30. The EGR passage 50 includes a main passage 51 arranged with an EGR cooler 52 for cooling the exhaust gas by an engine coolant, and an EGR cooler bypass passage 53 for bypassing the EGR cooler 52. An EGR valve 511 for adjusting a re-circulation amount of the exhaust gas to the intake passage 30 is arranged within the main passage 51 and an EGR cooler bypass valve 531 for adjusting a flow rate of the exhaust gas flowing through the EGR cooler bypass passage 53 is arranged within the EGR cooler bypass passage 53.

The diesel engine 1 with the configuration described as above is controlled by a powertrain control module 10 (hereinafter, referred to as the PCM). The PCM 10 (controller) is configured by a CPU, a memory, a counter timer group, an interface, and a microprocessor with paths for connecting these units.

As shown in FIGS. 1 and 2, detection signals of various kinds of sensors SW1 to SW16 are inputted to the PCM 10. The various kinds of sensors include sensors as follows: an air flow sensor SW1 for detecting the flow rate of the fresh air and an intake air temperature sensor SW2 for detecting the temperature of the fresh air that are arranged on the downstream of the air cleaner 31; a second intake air temperature sensor SW3 arranged on the downstream of the intercooler/warmer 34 and for detecting the temperature of the fresh air after passing through the intercooler/warmer 34; an EGR gas temperature sensor SW4 arranged close to a connection part of the EGR passage 50 with the intake passage 30 and for detecting the temperature of external EGR gas; an intake port temperature sensor SW5 attached to the intake port 16 and for detecting the temperature of the intake air immediately before flowing into the cylinder 18; a cylinder internal pressure sensor SW6 attached to the cylinder head 12 and for detecting the pressure inside the cylinder 18; an exhaust gas temperature sensor SW7 and an exhaust gas pressure sensor SW8 arranged close to a connection part of the exhaust passage 40 with the EGR passage 50 and for detecting the exhaust gas temperature and pressure, respectively; a linear $O_2$ sensor SW9 arranged on the upstream side of the direct catalyst 41 and for detecting an oxygen concentration within the exhaust gas; a lambda $O_2$ sensor SW10 arranged between the direct catalyst 41 and the underfoot catalyst 42 and for detecting the oxygen concentration within the exhaust gas; a fluid temperature sensor SW11 for detecting a temperature of the engine coolant; a crank angle sensor SW12 for detecting a rotational angle of the crank shaft 15; an accelerator position sensor SW13 for detecting an accelerator opening amount corresponding to an angle of an acceleration pedal (not illustrated) of the vehicle; cam angle sensors SW14 and SW15 on the intake and exhaust sides, respectively; and a fuel pressure sensor SW16 attached to the common rail 64 of the high pressure fuel supply system 62 and for detecting the fuel pressure to be supplied to the direct injector 67.

By performing various kinds of operations based on these detection signals, the PCM 10 determines the states of the engine 1 and the vehicle, and further outputs control signals to the direct injectors 67, the port injectors 68, the ignition plugs 25, the VVT 72 and CVVL 73 on the intake valve side, the VVL 71 on the exhaust valve side, the high pressure fuel supply system 62, and the actuators of the various kinds of valves (throttle valve 36, intercooler bypass valve 351, the EGR valve 511, and the EGR cooler bypass valve 531) according to the determined states. Thereby, the PCM 10 operates the engine 1.

Figure 4:
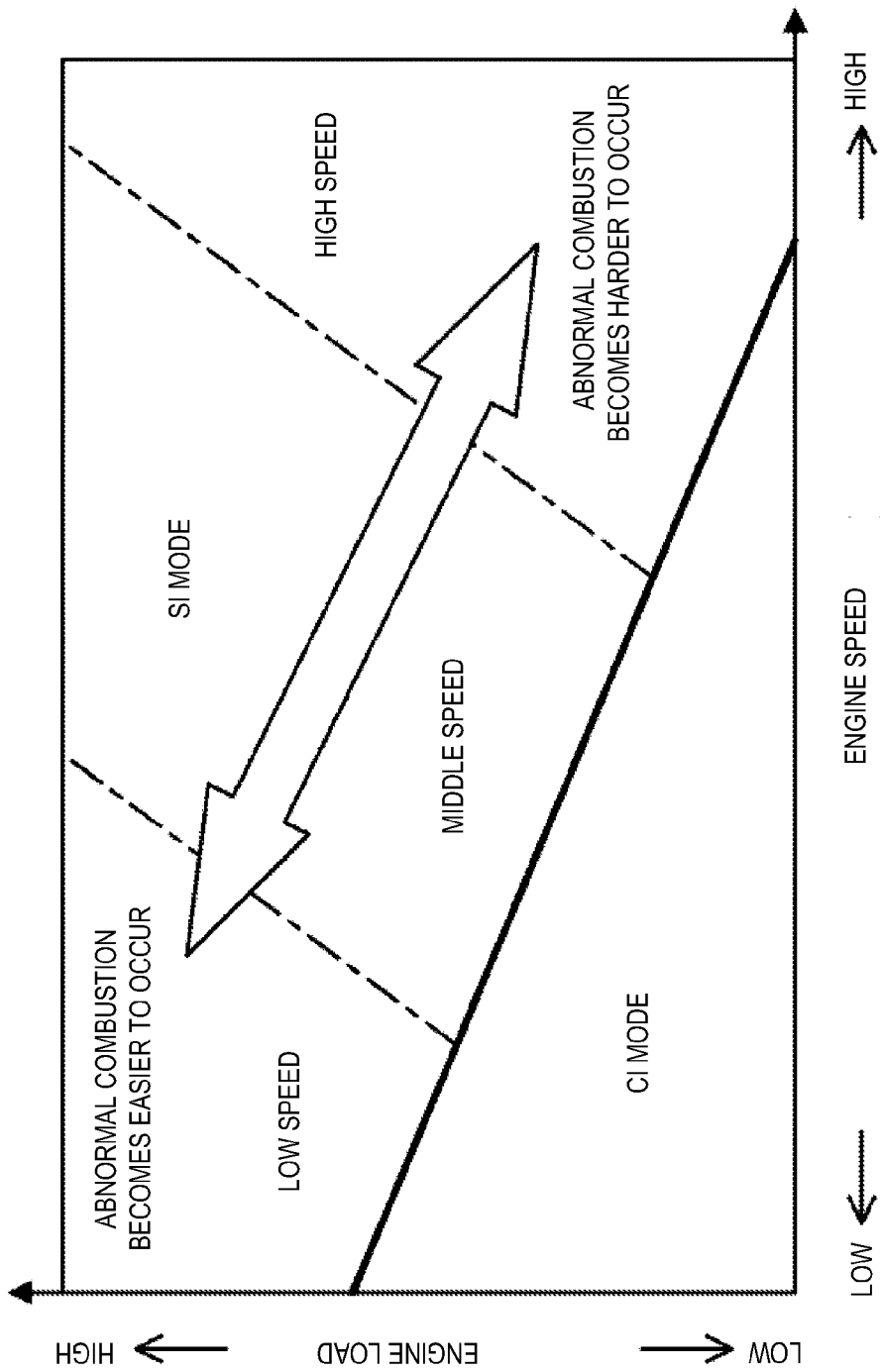
FIG. 4 is a chart exemplifying an operating range of the engine.

FIG. 4 shows an example of an operating range of the engine 1. Within a low engine load range where an engine load is relatively low, the engine 1 does not perform ignitions by the ignition plugs 25 and performs a compression-ignition combustion in which a combustion is generated by a compression self-ignition so as to improve fuel consumption and exhaust emission performance. However, with the compression-ignition combustion, the speed of the combustion becomes excessively rapid as the engine load increases, and thereby causes a problem of, for example, combustion noise. Therefore, with the engine 1, within a high engine load range where the engine load is relatively high, the compression-ignition combustion is stopped and is switched to a spark-ignition combustion using the ignition plugs 25. Further, with the compression-ignition combustion, a reaction time allowance becomes shorter as engine speed increases and the compression-ignition of the engine becomes difficult or impossible to be performed. Thus, with the engine 1, even within the relatively low engine load range, within a high engine speed range, the spark-ignition combustion is performed. Therefore, the engine 1 is configured to switch combustion mode between a CI (Compression-Ignition) mode where the compression-ignition combustion is performed and an SI (Spark-Ignition) mode where the spark-ignition combustion is performed. A boundary line where the combustion mode is switched between the CI mode and the SI mode is set comparatively downward to the right within the map of the engine speed and load shown in FIG. 4. Note that, the boundary line is not limited to this in the illustration.

In the CI mode (described in detail later), basically, the direct injector 67 injects the fuel inside the cylinder 18 at a comparatively early timing, for example, during either one of the intake stroke and compression stroke, and thereby, forms a comparatively homogeneous lean air-fuel mixture, and further the air-fuel mixture compression self-ignites near the compression top dead center. Meanwhile, in the SI mode, basically, the direct injector 67 injects the fuel inside the cylinder 18 during either one of the compression stroke and the compression stroke, and thereby, forms a homogenized or stratified lean air-fuel mixture, and further, the air-fuel mixture is ignited near the compression top dead center. Moreover, in the SI mode, the engine 1 is operated with a theoretical air-fuel ratio ($\lambda$=1). Thereby, the three-way catalyst can be used, and this becomes advantageous in improving the emission performance.

As described above, the geometric compression ratio of the engine 1 is set to be 14:1 or above (for example, 18:1). In the CI mode, because the high compression ratio increases temperature and pressure at the end of compression stroke, it is advantageous in stabilizing the compression-ignition combustion. Whereas, within the high engine load range, the high compression ratio engine 1 switches the combustion mode to the SI mode, therefore, particularly within a low engine speed range, there is an inconvenience that abnormal combustion such as a pre-ignition and knocking can easily occur as the engine load increases (see the white arrow in FIG. 4).

Thus, with the engine 1, when the operating state of the engine is within the high engine load range of the low engine speed range, by performing an SI combustion where an injection mode of the fuel is greatly differed from the conventional mode, abnormal combustion is avoided. Specifically, in the injection mode of the fuel of this embodiment, within a period that is significantly retarded between the late stage of the compression stroke and the early stage of expansion stroke (hereinafter, the period is referred to as the retard period), the fuel injection to the cylinder 18 is performed by the direct injector 67 with a significantly higher fuel pressure compared to the conventional mode. Hereinafter, this characteristic fuel injection mode is referred to as the "high pressure retarded injection."

Figure 5:
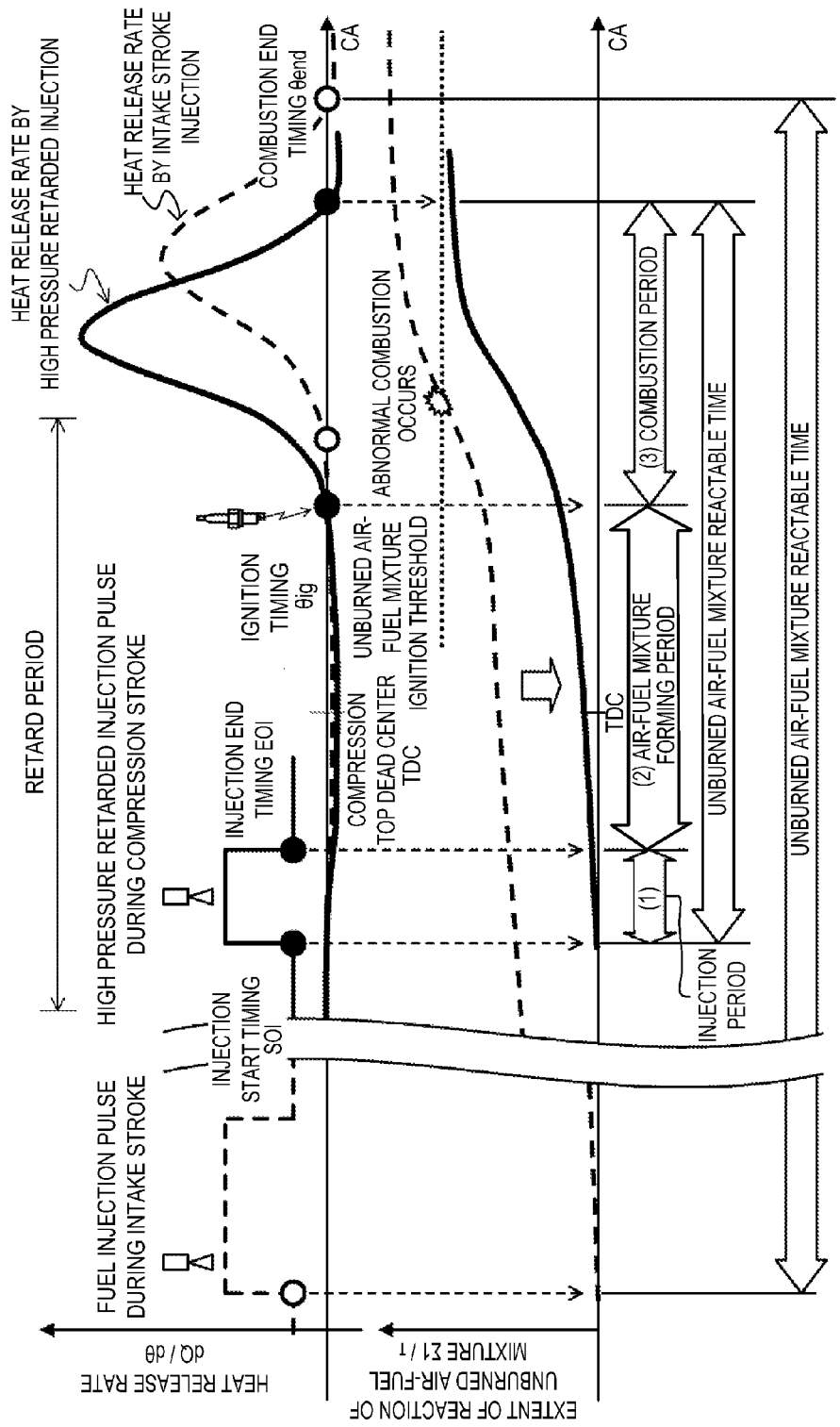
FIG. 5 is charts comparing a state of an SI combustion by a high pressure retarded injection and a state of the conventional SI combustion.

FIG. 5 is charts comparing, between the SI combustion by the high pressure retarded injection (solid line) and the conventional SI combustion in which the fuel injection is performed during the intake stroke (broken line), differences in a heat release rate (upper chart) and an extent of reaction of unburned air-fuel mixture (lower chart). The lateral axis in FIG. 5 indicates the crank angle. A condition of the comparison is that the operating state of the engine 1 is within the high engine load range of the low engine speed range, and a fuel amount to be injected is the same in both the SI combustion by the high pressure retarded injection and the conventional SI combustion cases.

First, for the conventional SI combustion, an injection of fuel with a predetermined amount into the cylinder 18 is performed during the intake stroke (broken line in the upper chart). During the period from after the fuel is injected into the cylinder 18 to when the piston 14 reaches the compression top dead center, the comparatively homogenized air-fuel mixture is formed inside the cylinder 18. Further, in this case, the ignition is performed at a predetermined timing indicated by the first white circle after the compression top dead center, and thereby, the combustion starts. As indicated by the broken line in the upper chart of FIG. 5, after the combustion starts, the combustion ends after progressing through a peak of the heat release rate. Here, a period between the start of the fuel injection to the end of the combustion corresponds to a reactable time of the unburned air-fuel mixture (hereinafter, it may simply be referred to as the reactable time) and, as indicated by the broken line in the lower chart of FIG. 5, the reaction of the unburned air-fuel mixture gradually progresses during the reactable time. The dotted line in the lower chart indicates an ignition threshold that represents a reactivity of the unburned air-fuel mixture to be ignited. The conventional SI combustion has an extremely long reactable time and the reaction of the unburned air-fuel mixture keeps progressing during the reactable time, therefore, the reactivity of the unburned air-fuel mixture exceeds the ignition threshold around the time of ignition and, thereby, causes abnormal combustion such as the pre-ignition and knocking.

On the other hand, the high pressure retarded injection aims to, by shortening the reactable time, avoid abnormal combustion. As shown in FIG. 5, the reactable time in this case is a time length where a period in which the direct injector 67 injects the fuel ((1) an injection period), a period from the end of the injection until a combustible air-fuel mixture is formed around the ignition plug 25 ((2) an air-fuel mixture forming period), and a period from the end of air-fuel mixture formation around the spark plug 25 until the combustion started by the ignition ends ((3) a combustion period) are added to each other, that is, (1)+(2)+(3). The high pressure retarded injection shortens the injection period, the air-fuel mixture forming period, and the combustion period, respectively, and thereby, shortens the reactable time. The shortenings of the periods are explained in sequence.

First, a high fuel pressure relatively increases the fuel injection amount to be injected from the direct injector 67 per unit time. Therefore, as shown in the chart in the second row of FIG. 6 labeled as "(1)", in a case where the fuel injection amount is set to be constant, a relation between the fuel pressure and the injection period of the fuel substantially becomes as follows: the injection period extends as the fuel pressure decreases, and the injection period contracts as the fuel pressure increases. Therefore, the high pressure retarded injection in which the fuel pressure is set significantly higher than the conventional pressure shortens the injection period.

Further, the high fuel pressure is advantageous in atomizing the atomized fuel injected into the cylinder 18 and further extends a spreading distance of the atomized fuel. Therefore, as shown in the chart in the third row of FIG. 6 labeled as "(A)", a relation between the fuel pressure and the fuel vaporization time substantially becomes as follows: the fuel vaporization time extends as the fuel pressure decreases, and fuel vaporization time contracts as the fuel pressure increases. Further, as shown in the chart in the fourth row of FIG. 6 labeled as "(B)", a relation between the fuel pressure and a time length for atomized fuel to reach around the ignition plug 25 substantially becomes as follows: the time length for the atomized fuel to reach around the ignition plug 25 (the atomized fuel reaching time) extends as the fuel pressure decreases, and the reaching time of the atomized fuel contracts as the fuel pressure increases. Note that, the time length for the atomized fuel to reach around the ignition plug 25 can be calculated from an atomized fuel spreading distance between the tip of the direct injector 67 and the ignition plug 25 and a fuel injection speed in proportion to the fuel pressure. The air-fuel mixture forming period is a time length where a fuel vaporization time and the atomized fuel reaching time to around the ignition plug 25 are added to each other ((A)+(B)), therefore, as shown in the chart in the second row of FIG. 6 labeled as "(2)", the air-fuel mixture forming period contracts as the fuel pressure increases. Therefore, the high pressure retarded injection in which the fuel pressure is set significantly higher than the conventional pressure shortens the fuel vaporization time and the atomized fuel reaching time to around the ignition plug 25 and, as a result, shortens the air-fuel mixture forming period. On the other hand, as indicated by the white circle of the chart in FIG. 6 labeled as "(2)", with the conventional intake stroke injection with the low fuel pressure, the air-fuel mixture forming period is significantly longer. Note that, as described above, the combination of the multi-hole injector 67 and the cavity 141 shortens the time length from the end of fuel injection until when the atomized fuel reaches around the ignition plug 25 and, as a result, becomes advantageous in shortening the air-fuel mixture forming period.

As above, shortening the injection period and the air-fuel mixture forming period enables the injection timing of the fuel to be retarded, to be more precise, the injection start timing to be set comparatively late. Therefore, as shown in the upper chart of FIG. 5, with the high pressure retarded injection, the fuel injection is performed within the retard period from the late stage of the compression stroke to the early stage of the expansion stroke. Although, accompanying the injection of the fuel into the cylinder 18 with the high fuel pressure, turbulence of flow inside the cylinder becomes strong and turbulence kinetic energy inside the cylinder 18 increases, the high turbulence kinetic energy is, together with the timing of the fuel injection being set to the comparatively late timing, advantageous in shortening the combustion period.

That is, as shown in the chart in the fourth row of FIG. 6 labeled as "(D)", in a case where the fuel injection is performed during the retard period, a relation between the fuel pressure and the turbulence kinetic energy during the combustion period substantially becomes as follows: the turbulence kinetic energy decreases as the fuel pressure decreases and the turbulence kinetic energy increases as the fuel pressure increases. Note that, the broken line in the chart of FIG. 6 labeled as "(D)" shows an example of a case where the fuel injection is performed during the intake stroke. Even if the fuel is injected into the cylinder 18 with the high fuel pressure, in the case where the injection timing is during the intake stroke, due to the time length until the ignition timing θ ig being long and the inside of the cylinder 18 being compressed on the compression stroke after the intake stroke, the turbulence inside the cylinder 18 is subsided. As a result, in the case where the fuel injection is performed during the intake stroke, the turbulence kinetic energy within the combustion period becomes comparatively low regardless of the level of the fuel pressure.

As shown in the chart in the third row of FIG. 6 labeled as "(C)", a relation between the turbulence kinetic energy within the combustion period and the combustion period substantially becomes as follows: the combustion period extends as the turbulence kinetic energy decreases and the combustion period contracts as the turbulence kinetic energy increases. Therefore, based on parts (C) and (D) in FIG. 6, a relation between the fuel pressure and the combustion period becomes as follows as shown in the chart in the second row of FIG. 6 labeled as "(3)": the combustion period extends as the fuel pressure decreases and the combustion period contracts as the fuel pressure increases. That is, the high pressure retarded injection shortens the combustion period. On the other hand, as indicated by the white circle in the chart in FIG. 6 labeled as "(3)", with the conventional intake stroke injection with the low fuel pressure, the combustion period extends. Note that, the multi-hole injector 67 is advantageous in increasing the turbulence kinetic energy inside the cylinder 18 and shortening the combustion period, and further, with the combination of the multi-hole injector 67 and the cavity 141, keeping the atomized fuel within the cavity 141 is also advantageous in shortening the combustion period.

Figure 6:
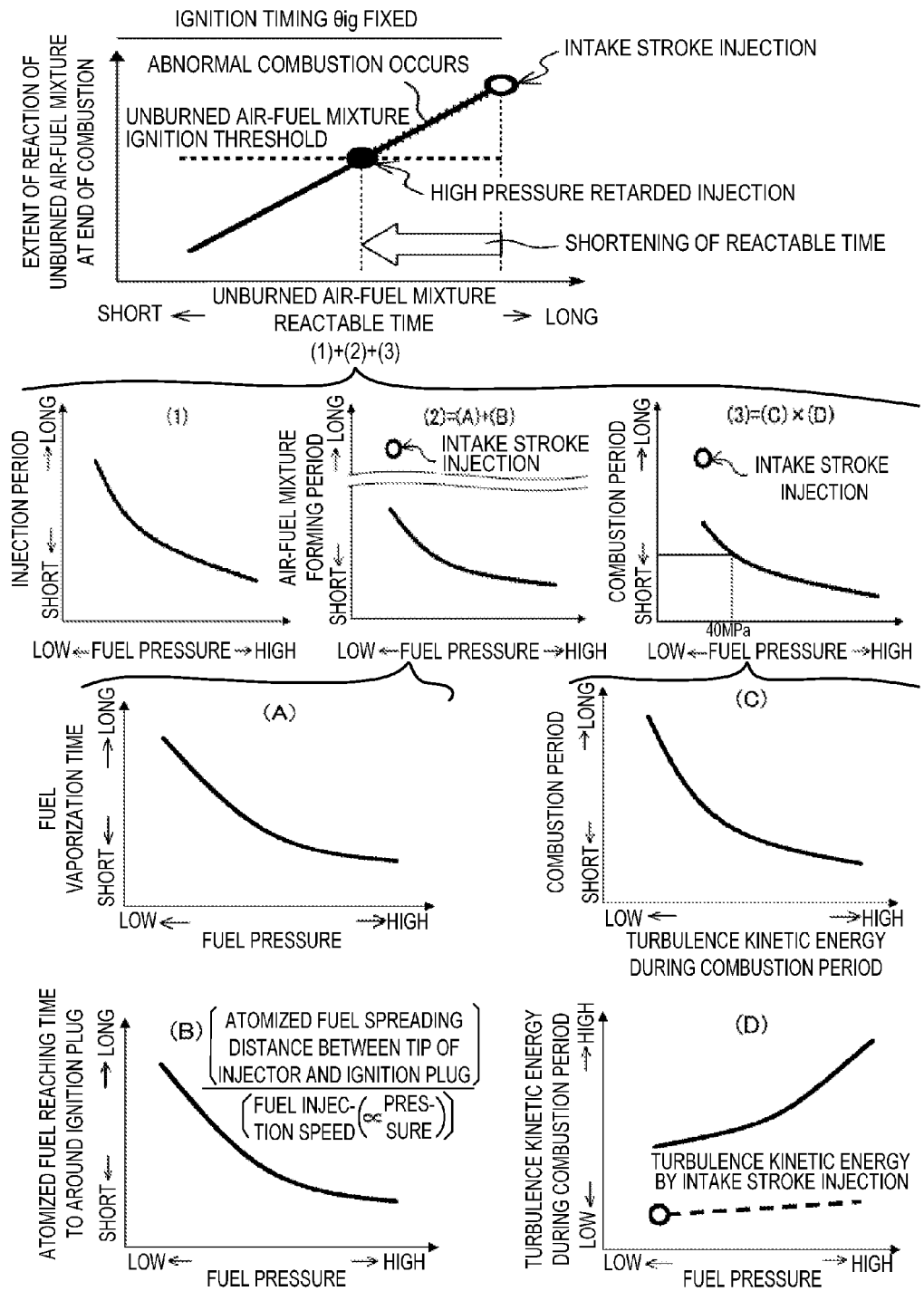
FIG. 6 is views showing, regarding a relation between an unburned air-fuel mixture reactable time and an extent of reaction of the unburned air-fuel mixture, a difference between the SI combustion by the high pressure retarded injection and the conventional SI combustion (the chart in the first row), and a relation of a fuel pressure with each of parameters relating to the unburned air-fuel mixture reactable time (each of the charts in the second to fourth rows).

Based on the relation between the fuel pressure and the combustion period shown in the chart of (3) in FIG. 6, in other words, based on the curve line shape in the chart, by setting the fuel pressure to, for example, 40 MPa or above, the combustion period can effectively be shortened. Further, the fuel pressure of 40 MPa or above can also effectively shorten the injection period and the air-fuel mixture forming period, respectively. Note that, the fuel pressure is preferably set according to the kind of the fuel used, which includes at least gasoline. The maximum value of the fuel pressure may be, for example, 120 MPa.

As above, the high pressure retarded injection shortens the injection period, the air-fuel mixture forming period, and the combustion period, respectively, and as a result, as shown in FIG. 5, can shorten the reactable time of the unburned air-fuel mixture from an injection start timing of fuel (SOI) to a combustion end timing θend to be significantly shorter than the conventional case where the fuel injection is performed during the intake stroke. As a result of shortening the reactable time, as shown in the chart in the first row of FIG. 6, although with the conventional intake stroke injection with low fuel pressure, as indicated by the white circle, the extent of the reaction of the unburned air-fuel mixture at the end of combustion exceeds the ignition threshold and abnormal combustion occurs, with the high pressure retarded injection, as indicated by the black circle, the progression of the reaction of the unburned air-fuel mixture at the end of the combustion is suppressed and abnormal combustion can be avoided. Note that, the ignition timings θ ig for cases indicated by the white and black circles in the chart in the first row of FIG. 6 are set to be the same.

Figure 7:
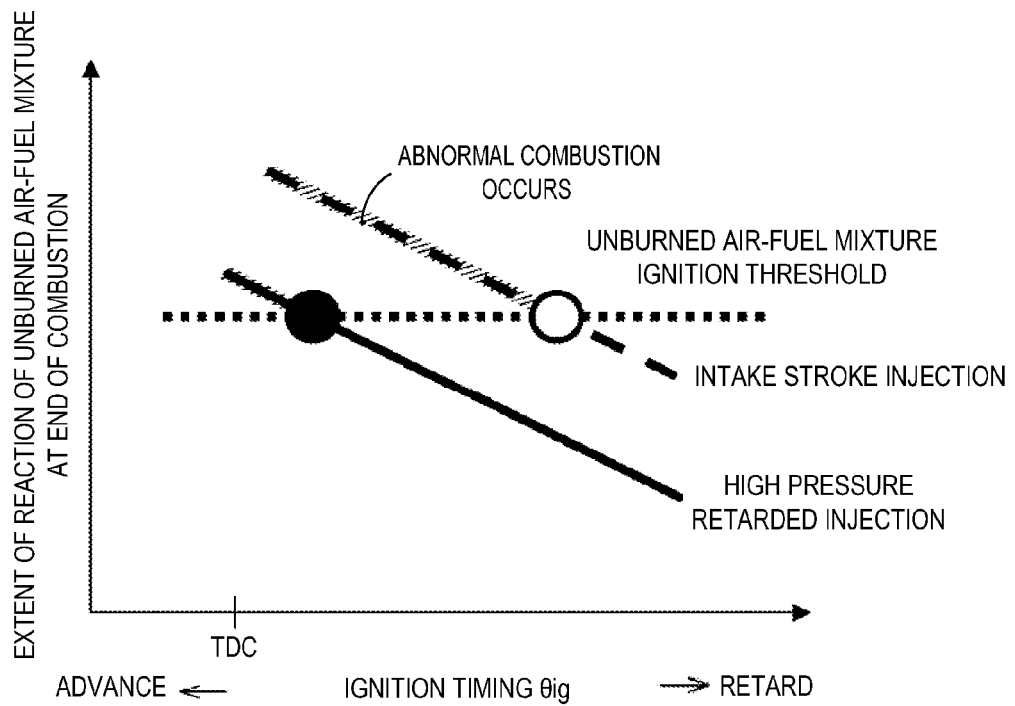
FIG. 7 is a chart showing, regarding a relation between ignition timing and the extent of reaction of the unburned air-fuel mixture, a difference between the SI combustion by the high pressure retarded injection and the conventional SI combustion.

The high pressure retarded injection avoids abnormal combustion by devising the mode of the fuel injection into the cylinder 18. Alternatively, conventionally, it has been known to retard the ignition timing θ ig for a purpose of avoiding abnormal combustion. The retarded ignition timing θ ig suppresses the increases of the temperature and pressure of the unburned air-fuel mixture and, thereby, suppresses the progression of the reaction of the unburned air-fuel mixture. FIG. 7 shows a relation between the ignition timing θ ig and the extent of reaction of the unburned air-fuel mixture at the end of combustion. The broken line in FIG. 7 shows the case of the conventional SI combustion in which the intake stroke injection is performed, and the solid line shows the case of the SI combustion in which the high pressure retarded injection is performed. As described above, because the retarded ignition timing θ ig suppresses the progression of the reaction of the unburned air-fuel mixture, each of the solid and broken lines is a downward-sloping curve. Further, as described above, because the high pressure retarded injection suppresses the progression of the reaction of the unburned air-fuel mixture by the fuel injection, with the ignition timings θ ig being set to be the same for both cases, the reaction of the unburned air-fuel mixture progresses more with the conventional SI combustion in which the intake stroke injection is performed, compared to the case of the SI combustion in which the high pressure retarded injection is performed. That is, the broken line is located above the solid line. Therefore, in the case where the conventional intake stroke injection is performed (white circle), the ignition timing θ ig needs to be retarded compared to the case where the high pressure retarded injection is performed (black circle) otherwise the progression of reaction of the unburned air-fuel mixture exceeds the ignition threshold. In other words, in the case of performing the high pressure retarded injection, the ignition timing θ ig can be advanced more than the case of performing the conventional intake stroke injection.

Figure 8:
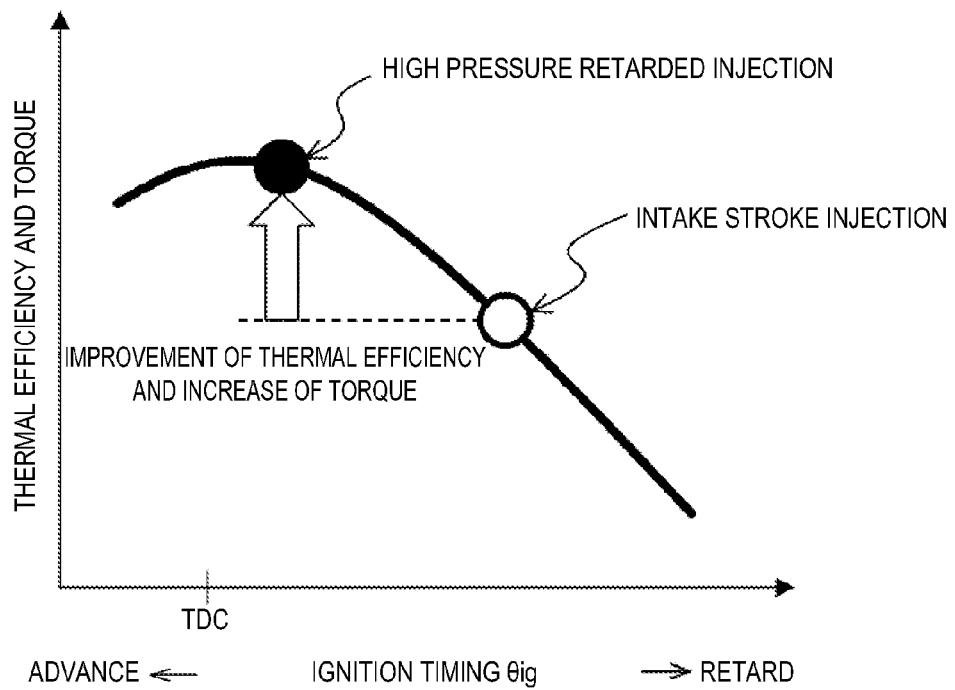
FIG. 8 is a chart showing, regarding a relation of the ignition timing with a thermal efficiency and a torque, a difference between the SI combustion by the high pressure retarded injection and the conventional SI combustion.

Further, FIG. 8 is a chart showing a relation of the ignition timing θ ig with thermal efficiency and torque. The ignition timing θ ig at which thermal efficiency and torque are at the maximum values, respectively, is near the compression top dead center, and thermal efficiency and torque decrease as the ignition timing θ ig is retarded. As described above, in the case of performing the injection during the intake stroke, as indicated by the white circle, the ignition timing θ ig needs to be retarded. On the other hand, in the case of performing the high pressure retarded injection, as indicated by the black circle, the ignition timing θ ig can be advanced, and thereby, the timing can approach the compression top dead center, thus, thermal efficiency improves and torque increases. That is, the high pressure retarded injection not only avoids abnormal combustion, but also enables the ignition timing θ ig to be advanced by the amount with which abnormal combustion can be avoided, and thereby, is advantageous in improving fuel consumption.

Figure 9:
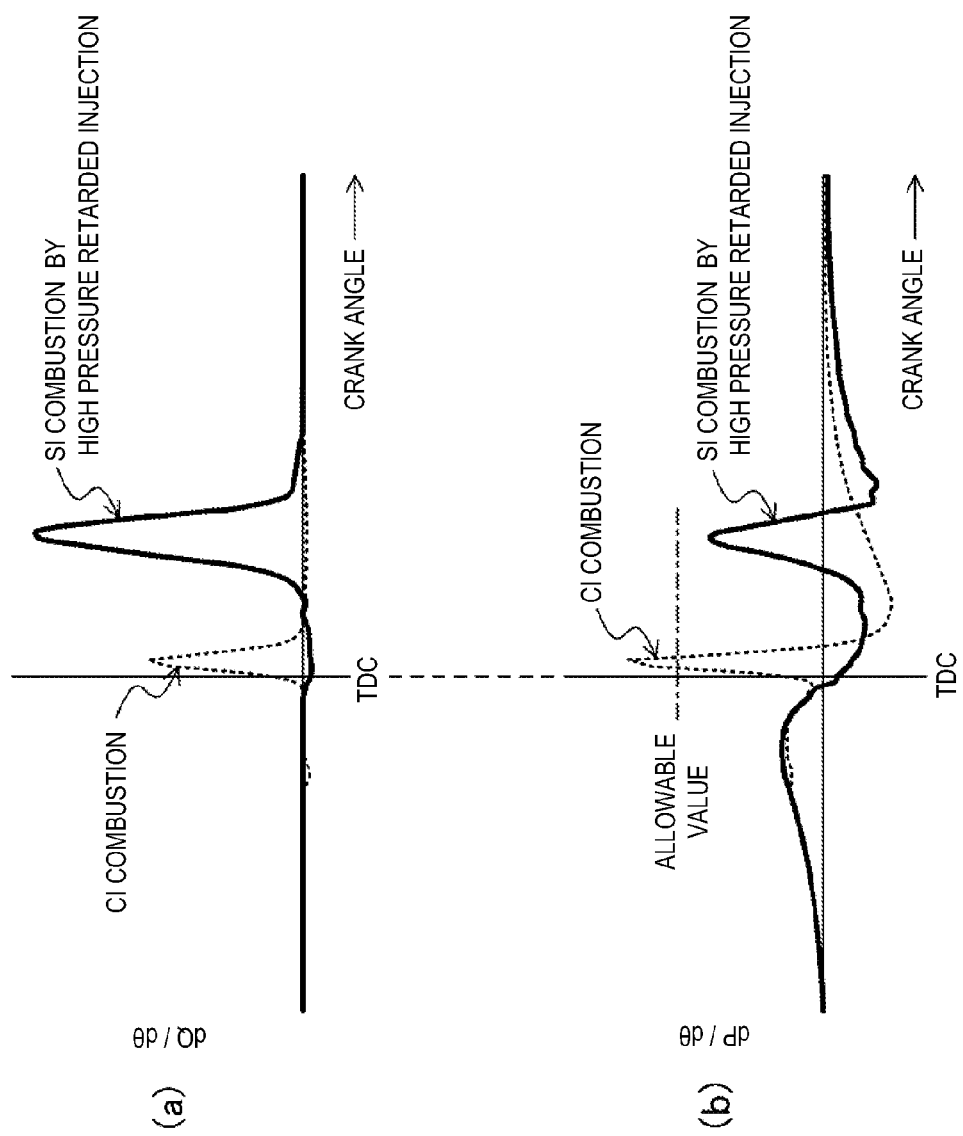
FIG. 9 is charts showing differences in (a) a heat release rate (dQ/dθ) and (b) a cylinder internal pressure increase rate (dP/dθ), between the SI combustion by the high pressure retarded injection and a CI combustion.

Here, the characteristic of the SI combustion using the high pressure retarded injection is briefly described with reference to FIG. 9. In FIG. 9, part (a) is a chart showing a change of the heat release rate (dQ/dθ) according to the crank angle, and part (b) is a chart showing a change of a cylinder internal pressure increase rate (dP/dθ) according to the crank angle. The solid lines in parts (a) and (b) indicate the case where the SI combustion using the high pressure retarded injection is performed, and the broken lines in parts (a) and (b) indicate the case where the compression-ignition combustion (CI combustion) is performed. Note that, the operating state of the engine 1 is within the high engine load range of the low engine speed range. First, with the CI combustion, as shown in part (a) of FIG. 9, the speed of combustion becomes rapid and the combustion period becomes extremely short. Further, as shown in part (b) of FIG. 9, a peak of the cylinder internal pressure becomes too high and exceeds the allowable value, and the problem of combustion noise arises. That is, the above results indicate that when the operating state of the engine 1 is within the high engine load range of the low engine speed range, the CI combustion cannot be performed.

On the other hand, with the SI combustion using the high pressure retarded injection, as shown in part (a) of FIG. 9, a high heat release rate and an appropriate combustion period are secured and sufficient torque is obtained, and further, as shown in part (b) of FIG. 9, the peak of the cylinder internal pressure becomes lower than the allowable value and the generation of combustion noise can be avoided. That is, when the operating state of the engine 1 is within the high engine load range of the low engine speed range, the SI combustion using the high pressure retarded injection is extremely advantageous.

Figure 10:
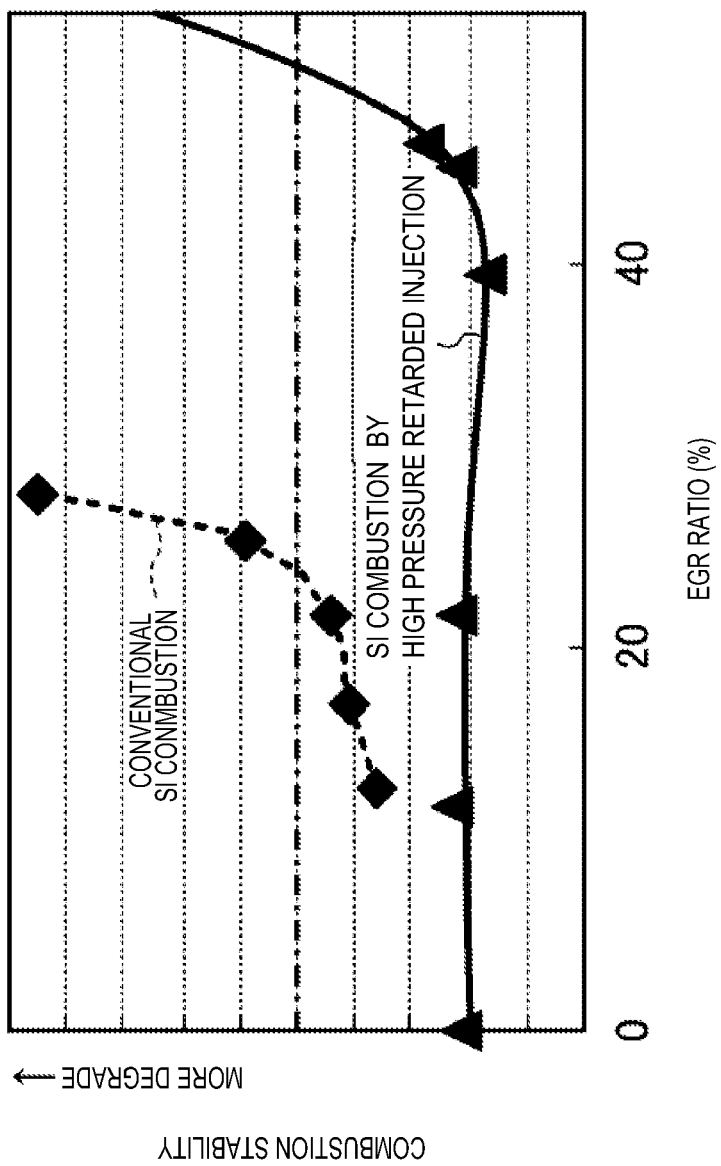
FIG. 10 is a chart showing a difference in combustion stability with respect to an EGR ratio between the conventional SI combustion and the SI combustion by the high pressure retarded injection.

Further, FIG. 10 shows relations of combustion stability with respect to an EGR ratio (%) in the respective cases of the conventional SI combustion and the SI combustion by the high pressure retarded injection. Here, the EGR ratio (%) is defined as follows: the EGR ratio (%)=an EGR gas mass (g)/(a mass of the fresh air (g)+the EGR gas mass (g)).

First, as indicated by the broken line in FIG. 10, the conventional SI combustion causes combustion stability to rapidly degrade when the EGR ratio exceeds approximately 20%, and exceeds an allowable value indicated by the one-dot chain line therein. Therefore, with the conventional SI combustion, the EGR ratio needs to be restricted to about 20% of the maximum. Whereas, as indicated by the solid line in FIG. 10, with the SI combustion by the high pressure retarded injection, because combustion stability is high due to the combustion period being short, combustion stability can be secured without exceeding the allowable value until the EGR ratio of, for example, about 40 to 50%. That is, the SI combustion by the high pressure retarded injection achieves an EGR ratio (30 to 50%) that is higher than the case of the convention SI combustion.

Next, operation states of the intake and exhaust valves 21 and 22 and examples of controlling the fuel injection timing and the ignition timing θ ig according to the operating state of the engine 1 are described with reference to FIG. 11. Here, in cases shown in parts (a), (b), (c) and (d) of FIG. 11, the operating state of the engine 1 is basically within the low engine speed range and the engine load becomes higher in the order of (a)<(b)<(c)<(d). In the cases of parts (a) and (b), the operating state is within the low engine load range corresponding to the CI mode and, in the case of part (c), the operating state is within the high engine load range corresponding to the SI mode. In the case of part (d), the operating state is within the engine fully loaded range (the fully loaded engine load) corresponding to the SI mode. Note that, the case of part (d) also corresponds to the case where the operating state of the engine 1 is within a middle engine speed range of the high engine load range.

Figure 11:
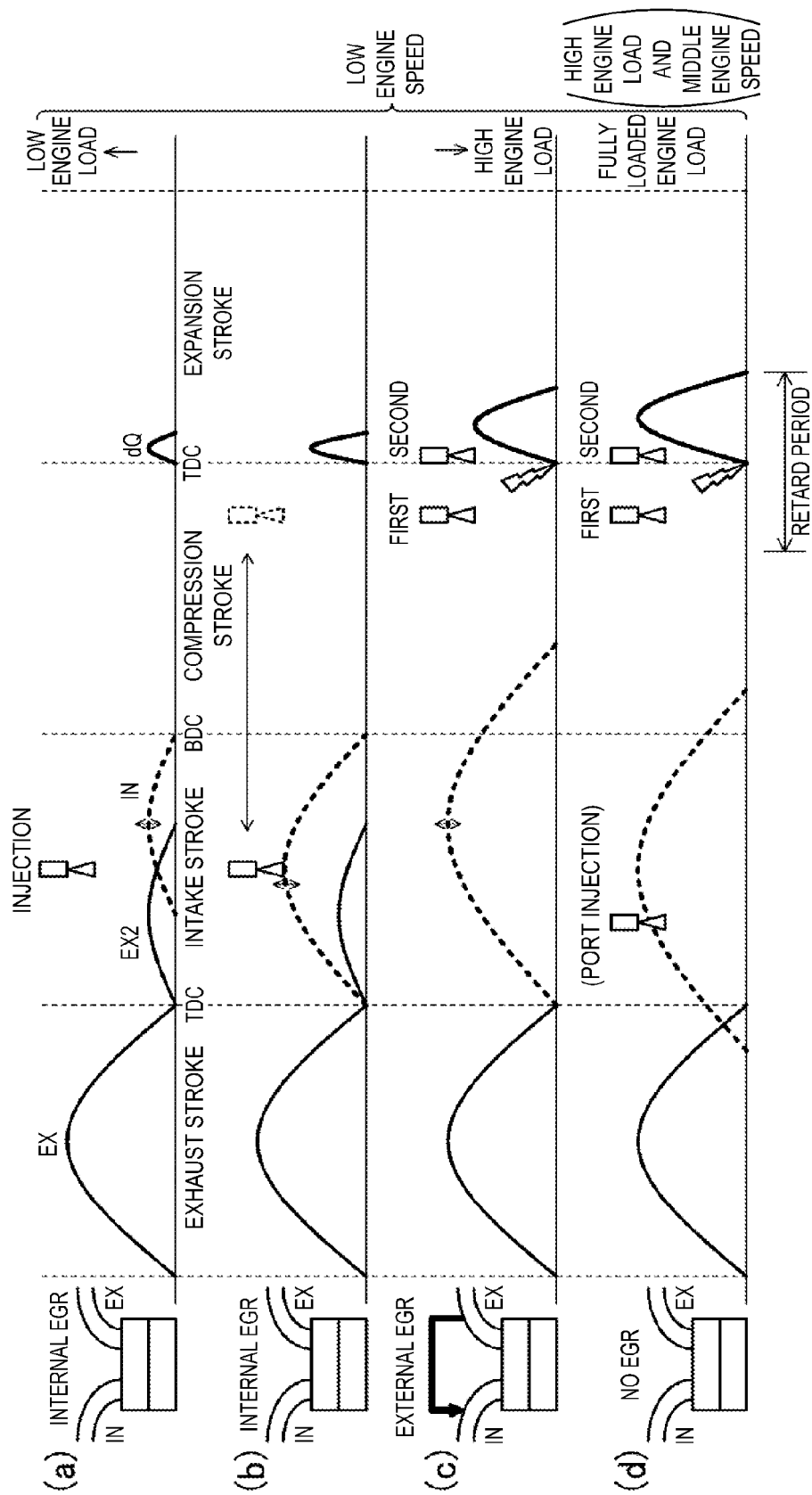
FIG. 11 is timing charts showing a difference in operations of an intake valve and an exhaust valve, and a difference in the ignition timing and an injection timing, according to a change of an engine load.

First, part (a) in FIG. 11 indicates when the operating state of the engine 1 is within the low engine load range of the low engine speed range. Because the combustion mode in this range is CI mode, the exhaust valve is opened twice, in which the exhaust valve 22 is opened during the intake stroke, by controlling the VVL 71 (see the solid line labeled as "EX2" in the part (a) of FIG. 11, note that, the solid line indicates a lift curve of the exhaust valve 22 and the broken line indicates a lift curve of the intake valve 21), and thereby, the internal EGR gas is introduced into the cylinder 18. The introduction of the internal EGR gas increases the temperature at the end of the compression stroke and stabilizes the compression-ignition combustion. The timing of the fuel injection is set to be during the intake stroke, and the direct injector 67 injects the fuel into the cylinder 18, thereby, the homogenous lean air-fuel mixture is formed inside the cylinder 18. Note that, the fuel injection amount is set according to the engine load.

Part (b) in FIG. 11 also shows the case where the operating state of the engine 1 is within the low engine load range of the low engine speed range. However, the engine load in the case of part (b) in FIG. 11 is higher than the case of part (a) in FIG. 11. Because the combustion mode within this operating range is also the CI mode, similar to the above, the exhaust valve is opened twice during one cycle of the engine by controlling the VVL 71 and the internal EGR gas is introduced into the cylinder 18. Note that, the temperature inside the cylinder 18 naturally increases as the engine load increases, therefore, in view of avoiding pre-ignition, an internal EGR amount is reduced. As illustratively shown in parts (a) and (b) of FIG. 11, the lift of the intake valve 21 may be adjusted by controlling the CVVL 73, so as to adjust the internal EGR amount. Note that, although it is not illustrated in the drawings, the internal EGR amount may be controlled by adjusting the opening of the throttle valve 36. Further, the timing of the fuel injection is set to a suitable timing during the intake stroke or the compression stroke. The direct injector 67 injects the fuel into the cylinder 18 at the set timing and, thereby, forms the homogenized or stratified lean air-fuel mixture. Similar to the case of part (a) in FIG. 11, the fuel injection amount is set according to the engine load.

Note that, parts (a) and (b) in FIG. 11 show examples in which the opening period of the exhaust valve 22 during the intake stroke is set to be in the earlier-half stage thereof. The opening period of the exhaust valve 22 may be set to be in the later-half stage of the intake stroke. Further, if the opening period of the exhaust valve 22 is set to be in the earlier-half stage of the intake stroke, the exhaust valve 22 may be kept opened from during the exhaust stroke, which includes the exhaust top dead center, to the earlier-half stage of the intake stroke.

Part (c) in FIG. 11 shows a case where the operating state of the engine 1 is within the high engine load range of the low engine speed range. The combustion mode within this operating range is the SI mode, and the exhaust valve 22 is not opened twice during one cycle of the engine within this operating range. Further, in the SI mode, a charging amount of air-fuel mixture is adjusted to satisfy the air-fuel ratio λ=1. The adjustment of the charging amount may be performed by a retarded closure of the intake valve 21, where the closing timing of the intake valve 21 is set to be after an intake bottom dead center by controlling the VVT 72 and the CVVL 73, while the throttle valve 36 is fully opened. This is beneficial in reducing a pumping loss. The adjustment of the charging amount may be performed by controlling the opening of the EGR valve 511 so as to adjust amounts of fresh air and external EGR gas to be introduced into the cylinder 18, while the throttle valve 36 is fully opened. This is beneficial in reducing the pumping loss as well as reducing a cooling loss. The introduction of the external EGR gas contributes in avoiding abnormal combustion and is advantageous in suppressing a generation of Raw NOx. Alternatively, the retarded closure control of the intake valve 21 and the control of the external EGR may be combined to adjust the charging amount. Especially, when the engine load is relatively low within the high engine load range, the charging amount may be adjusted through the retarded closure control of the intake valve 21 while introducing the external EGR gas into the cylinder 18 so as to suppress the excessive increase of the EGR ratio.

Further, the mode of the fuel injection in this case is the high pressure retarded injection. Therefore, the direct injector 67 directly injects the fuel into the cylinder 18 by high fuel pressure within the retard period from the late stage of the compression stroke to the early stage of the expansion stroke. In the high pressure retarded injection, the injection may be once (i.e., the lump-sum injection) or, alternatively, as shown in the part (c) of FIG. 11, two injections; a first injection and a following second injection may be performed within the retard period (i.e., the divided injections). The first injection can secure a relatively long air-fuel mixture forming period and, therefore, is beneficial in vaporizing and atomizing the fuel. The timing of the second injection can be set to a further retarded timing corresponding to the sufficient air-fuel mixture forming period secured by the first injection. This is beneficial in increasing the turbulence kinetic energy inside the cylinder as well as in shortening the combustion period. In the case of performing the divided injections, the fuel injection amount in the second injection is preferably set larger than the fuel injection amount in the first injection. Thereby, the turbulence kinetic energy is sufficiently increased, which is beneficial in shortening the combustion period and, as a result, avoiding abnormal combustion. Note that, the divided injections may only be performed when the engine load is relatively high within the high engine load range, where the fuel injection amount increases. When the engine load is relatively low within the high engine load range, where the fuel injection amount is comparatively small, the lump-sum injection may be performed. Further, the divided injections are not limited to twice and may be three times or above.

Thereby, in the SI mode, the ignition by the ignition plug 25 is executed near the compression top dead center after the fuel injection.

Part (d) in FIG. 11 shows a case where the operating state of the engine 1 is within the engine fully loaded range (the fully loaded engine load) of the low engine speed range. Similar to part (c) in FIG. 11, the combustion mode within this operating range is also the SI mode, and the exhaust valve 22 is not opened twice during one cycle of the engine. Further, due to the operating state being within the engine fully loaded range, the external EGR is stopped by closing the EGR valve 511.

The mode of the fuel injection in this case is basically the high pressure retarded injection, and, as shown in part (d) of FIG. 11, the two injections of the first and second injections into the cylinder 18 are performed within the retard period. Note that, the high pressure retarded injection may be the lump-sum injection. Further, within the engine fully loaded range, the injections during the intake stroke may be added so as to improve an intake air charging efficiency. The intake stroke injection improves the intake air charging efficiency due to the cooling effect of the intake air caused by the fuel injection and is advantageous in increasing the torque. Therefore, when the operating state of the engine 1 is within the engine fully loaded range of the low engine speed range, the fuel injection is performed three times: the intake stroke injection, and the first injection and second injections, or the fuel injection is performed twice: the intake stroke injection and the lump-sum injection.

Here, as described above, the high pressure retarded injection in which the fuel is directly injected into the cylinder 18 by the direct injector 67 has an extremely high fuel pressure. Therefore, if the fuel is directly injected into the cylinder 18 with such a high fuel pressure during the intake stroke, there is a possibility that a large amount of fuel will adhere on a wall surface of the cylinder 18 and, thereby, causes a problem such as oil dilution. Thus, in the intake stroke injection, the fuel is injected into the intake port 16 through the port injector 68 for injecting the fuel with the relatively low fuel pressure, without using the direct injector 67. Thereby, the above described problems such as oil dilution are avoided.

Further, as described above, the case shown in part (d) of FIG. 11 also corresponds to a case where the operating range of the engine 1 is within the middle engine speed range of the high engine load range. When the operating state of the engine 1 within the middle engine speed range, the flow inside the cylinder 18 becomes stronger compared to within the low engine speed range and an actual time length required for the change of the crank angle becomes shorter, thus, it becomes advantageous in avoiding abnormal combustion. Therefore, even if the fuel amount of the high pressure retarded injection that is performed during the retard period, from the late stage of the compression stroke to the early stage of the expansion stroke, is reduced, abnormal combustion may be avoided. Thus, when the operating state of the engine 1 is within the middle engine speed range of the high engine load range, the fuel injection amount of the high pressure retarded injection is reduced and the fuel amount corresponding to the reduced amount is added to the intake stroke injection for injecting during the intake stroke. Thereby, similar to the above, the intake air charging efficiency improves, and as a result, this case becomes advantageous in increasing the torque. Therefore, when the operating state of the engine 1 is within the middle engine speed range of the high engine load range, both avoiding abnormal combustion and the improvement in torque are achieved. Note that, when cases of the operating state of the engine 1 being within the high engine load range (specifically, the engine fully loaded range) of the low engine speed range and being within the middle engine speed range of the high engine load range are compared to each other, in other words, when, within the high engine load range, the low engine speed range and the middle range are compared to each other, there are cases where the fuel injection amount of the intake stroke injection may increase more within the middle engine speed range than within the low engine speed range.

Figure 12:
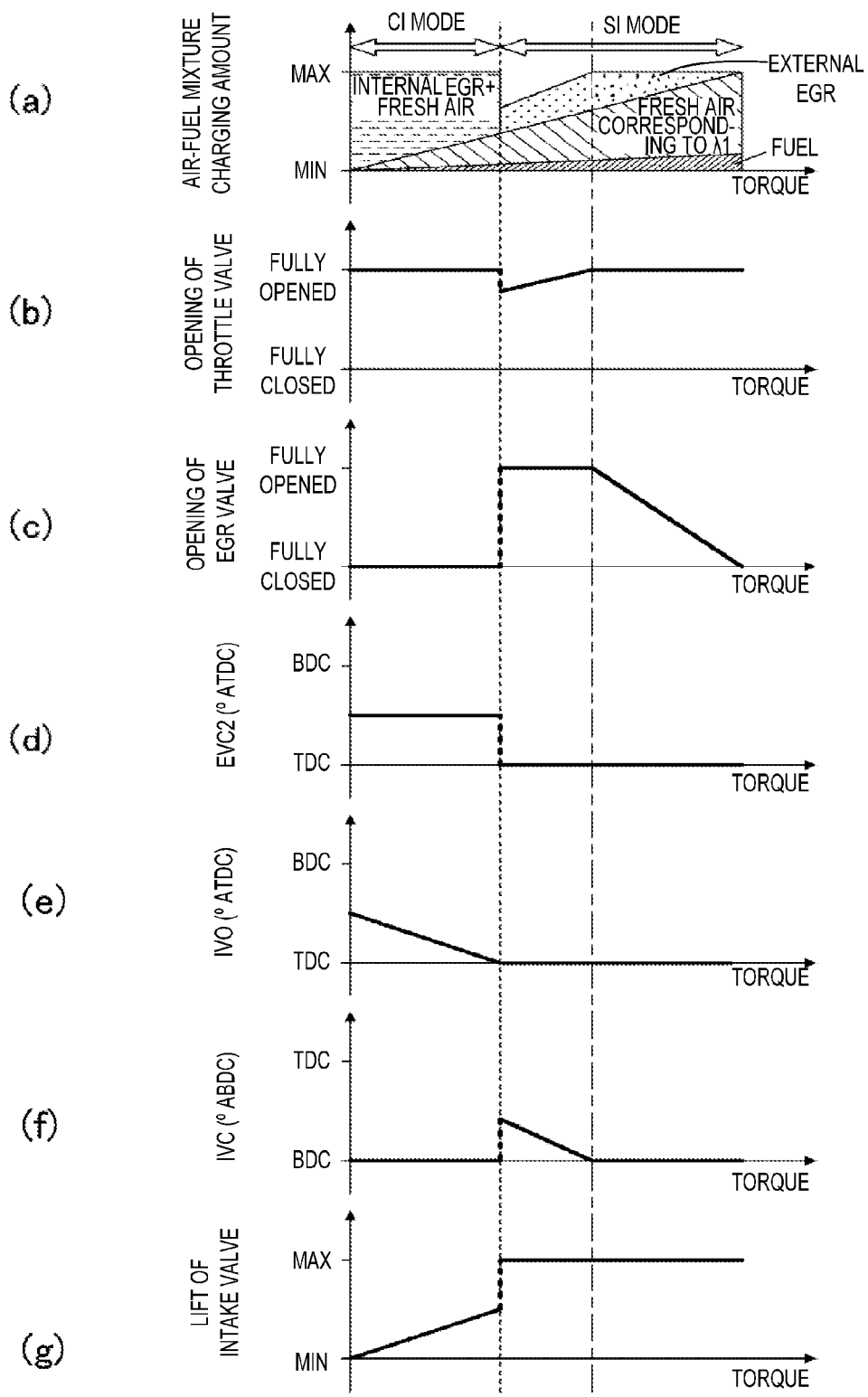
FIG. 12 is charts showing an example of changes of (a) an air-fuel mixture charging amount, (b) a throttle valve opening, (c) an EGR valve opening, (d) a closing timing in a case where the exhaust valve is opened twice, (e) an opening timing of the intake valve, (f) a closing timing of the intake valve, and (g) a lift of the intake valve, in a case where a control of an internal EGR amount is performed by a control of the intake valve within a low engine load range.
Figure 13:
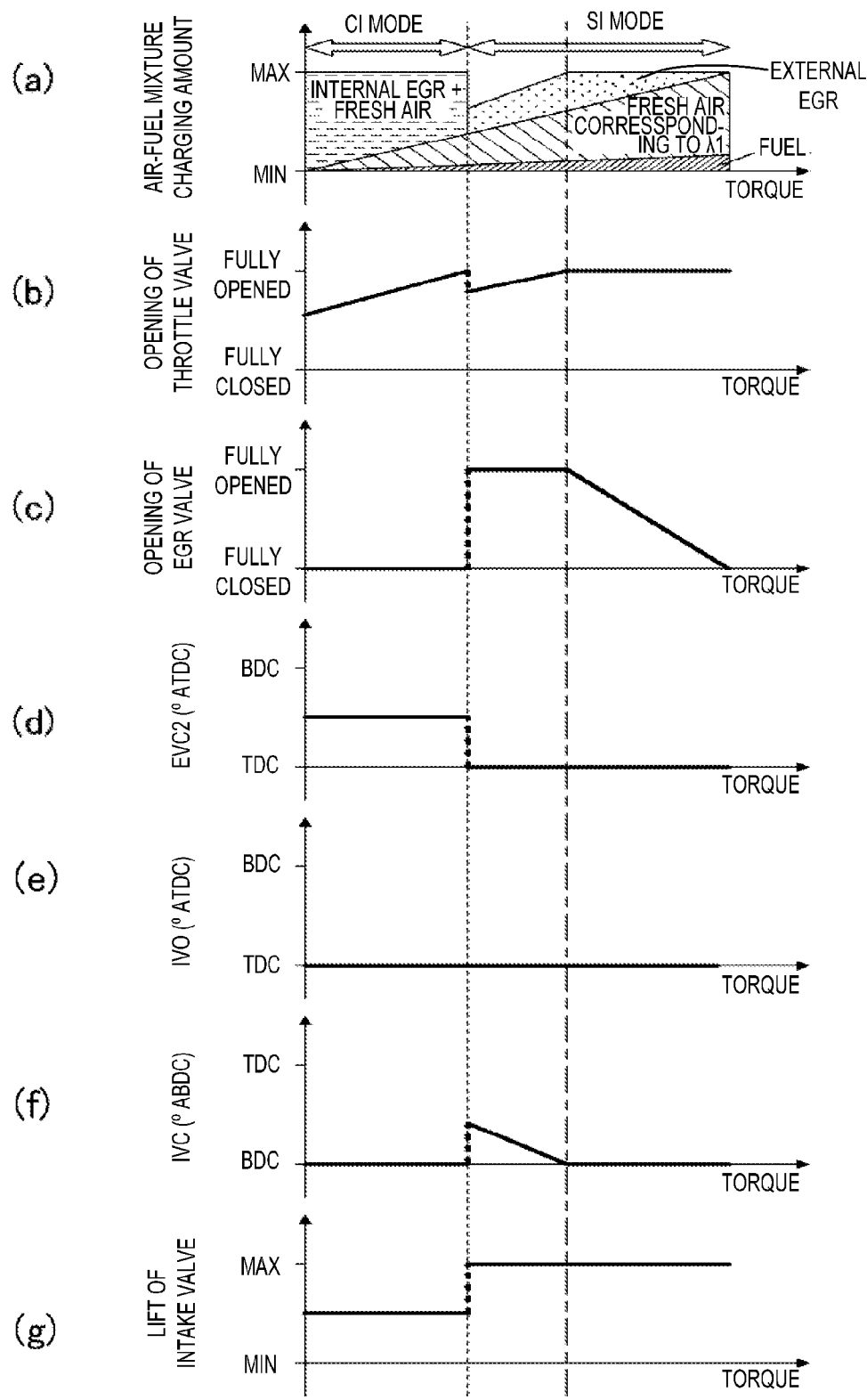
FIG. 13 is charts corresponding to FIG. 12 in a case where the control of the internal EGR amount is performed by a control of the throttle valve within a low engine load range.

FIGS. 12 and 13 show the control examples of the respective parameters of the engine 1 according to the variation in engine load within the low engine speed range, that are: (b) the opening of the throttle valve 36, (c) the opening of the EGR valve 511, (d) the closing timings in the case where the exhaust valve 22 is opened twice, (e) the opening timing of the intake valve 21, (f) closing timing of the intake valve 21, and (g) the lift of the intake valve.

Part (a) in FIG. 12 shows a state inside the cylinder 18. By having the lateral axis as the torque (in other words, the engine load) and the vertical axis as the air-fuel mixture charging amount, part (a) in FIG. 12 shows a configuration of the air-fuel mixture inside the cylinder. As described above, the combustion mode within the left half side range of the chart, where the engine load is relatively low, is the CI mode, and the right half side range of the chart, where the engine load is higher than a predetermined engine load, is the SI mode. The fuel amount (total fuel amount) is increased corresponding to the increase of the engine load regardless of the combustion mode being the CI or SI mode. Therefore, with respect to the fuel amount, the amount of fresh air is set to satisfy the theoretical air-fuel ratio ($\lambda=1$), and the amount of fresh air is increased corresponding to the increase of the engine load, as the fuel amount increases.

In the CI mode, as described above, due to the internal EGR gas being introduced into the cylinder 18, the rest of the charging amount of the air-fuel mixture is formed by the internal EGR gas and the excess fresh air. Therefore, in the CI mode, the air-fuel mixture becomes lean.

Whereas, in the SI mode, the engine 1 is operated to satisfy 1. The external EGR gas is introduced into the cylinder 18 while the introduction of the internal EGR gas is stopped. Here, although the detail is described below, the charging amount into the cylinder 18 is reduced within the relatively low engine load range in the SI mode, in other words, within the middle engine load range under the SI mode relating to the switch of the mode to the CI mode (i.e., the range between the broken line and the one-dot chain line in FIG. 12). As one of the control examples, in FIG. 12, the charging amount is controlled by adjusting the closing timing of the intake valve 21. Note that, hereinafter, the middle engine load range relating to the switch of the mode to the CI mode may be referred to as the switching range.

As shown in part (b) of FIG. 12, the throttle valve 36 is, although basically set to be fully opened regardless of the level of the engine load, throttled within the switching range. Further, as shown in part (c) of FIG. 12, the EGR valve 511 is set to be fully closed in the CI mode, whereas it is set to be fully opened within the switching range of the SI mode. Further, within the range where the engine load is higher than the switching range, the EGR valve 511 is gradually throttled as the engine load increases, and the EGR valve 511 is fully closed when the engine is fully loaded. By adjusting the openings of the throttle valve 36 and the EGR valve 511, as shown in part (c) of FIG. 14, the external EGR ratio becomes zero in the CI mode, and becomes the maximum within the switching range of the SI mode, and the EGR ratio gradually reduces as the engine load increases within the range where the engine load is higher than the switching range so as to be zero when the engine is fully loaded again. As above, within the switching range, the negative pressure on the downstream of the throttle valve 36 is adjusted by the opening adjustment of the throttle valve 36 so as to adjust the recirculation amount of the external EGR gas through the EGR passage 50 and, thus, the external EGR ratio (specifically, to adjust the external EGR ratio to be constant at the maximum value). The adjustment of the external EGR ratio is advantageous in reducing the pumping loss. Note that, within the switching range, the external ratio may be adjusted by the opening adjustment of the EGR valve 511.

Part (d) in FIG. 12 shows the closing timings of the exhaust valve 22 in the case where it is opened twice. In the CI mode, as described above, the closing timings are set to predetermined timings between the exhaust top dead center and the intake bottom dead center so as to introduce the internal EGR gas into the cylinder 18. Meanwhile, in the SI mode, the closing timing is set to the exhaust top dead center. That is, in the SI mode, the opening of the exhaust valve twice is stopped and, as a result, the control of the internal EGR is stopped.

As above, in the case of opening the exhaust valve 22 twice, the closing timings are set to the predetermined closing timings in the CI mode. Whereas, as shown in part (e) of FIG. 12, the opening timing of the intake valve 21 is advanced as the engine load increases, so as to approach the exhaust top dead center. Therefore, the internal EGR gas to be introduced into the cylinder 18 increases as the engine load decreases and the internal EGR gas to be introduced into the cylinder 18 decreases as the engine load increases. The temperature inside the cylinder 18 at the end of the compression stroke increases as the engine load decreases because of the correspondingly increasing amount of internal EGR gas, therefore the case of (e) is advantageous in achieving the stable compression-ignition combustion. Further, the increase of temperature inside the cylinder 18 at the end of the compression stroke is suppressed as the engine load increases because the internal EGR gas is suppressed, therefore the case of (e) is advantageous in suppressing the pre-ignition. Further, in the SI mode, the opening timing of the intake valve 21 is set to be at the exhaust top dead center.

Meanwhile, as shown in part (f) of FIG. 12, the closing timing of the intake valve 21 is set to be constant at the intake bottom dead center in the CI mode. On the other hand, in the switching range of the SI mode, the closing timing of the intake valve 21 is more retarded than the intake bottom dead center. The retarded amount is set to gradually decrease corresponding to the increase of the engine load so that the retarded amount is large when the engine load is relatively low, and is small when the engine load is relatively high. Thereby, in the switching range, the charging amount of the air-fuel mixture is reduced by the retarded closure control of the intake valve 21. Note that, alternative to the retarded closure control of the intake valve 21, the charging amount of the air-fuel mixture may be reduced by performing the opening adjustment of the throttle valve 36 in the SI mode. Within the range where the engine load is higher than the switching range, the closing timing of the intake valve 21 is set to be at the intake bottom dead center and, thereby, the charging amount increases to be the maximum value again.

Further, as shown in part (g) of FIG. 12, in the CI mode, the lift of the intake valve 21 gradually increases starting from the minimum lift corresponding to the increase of the engine load, whereas, in the SI mode, the lift is set to be constant at the maximum lift regardless of the level of the engine load.

Therefore, within the range where the engine load is higher than within the switching range, the throttle valve 36 is set to be fully opened (part (b) in FIG. 12) and the opening and closing timings of the intake valve 21 (parts (e) and (f) in FIG. 12) as well as the lift thereof (part (g) in FIG. 12) are set to be constant. Thereby, a ratio of the amount of fresh air to be introduced into the cylinder 18 and the external EGR gas amount is adjusted by the opening adjustment of the EGR valve 511. Such a control is advantageous in reducing the pumping loss.

FIG. 13 shows another control example different from the example of FIG. 12. In FIGS. 12 and 13, the controls of (b) the opening of the throttle valve 36, (e) the opening timing of the intake valve 21, and (g) the lift of the intake valve 21 in the CI mode are different from each other. That is, firstly in the control shown in FIG. 13, as shown in part (b), the throttle valve 36 is throttled in the CI mode, and the opening of the throttle valve 36 is controlled to gradually increase corresponding to the increase of the engine load so as to be small when the engine load is relatively low in the CI mode, and large when the engine load is relatively high in the CI mode. Meanwhile, the throttle valve 36 is fully opened in the SI mode except within the switching range.

Further, as shown in part (e) of FIG. 13, the opening timing of the intake valve 21 is set to be constant at the exhaust top dead center in the CI mode regardless of the level of the engine load, and, as shown in part (g) of FIG. 13, the lift of the intake valve 21 is set to be constant at a predetermined lift in the CI mode regardless of the level of the engine load. By such a combination of the controls of the throttle valve 36 and the intake valve 21, in the CI mode, the internal EGR gas amount to be introduced into the cylinder 18 is adjusted according to the opening of the throttle valve 36. Therefore, as it is clear from comparing parts (a) in FIGS. 12 and 13 with each other, the configuration of the air-fuel mixture to be charged into the cylinder 18 in the control example shown in FIG. 13 is similar to that of the control example shown in FIG. 12.

Figure 14:
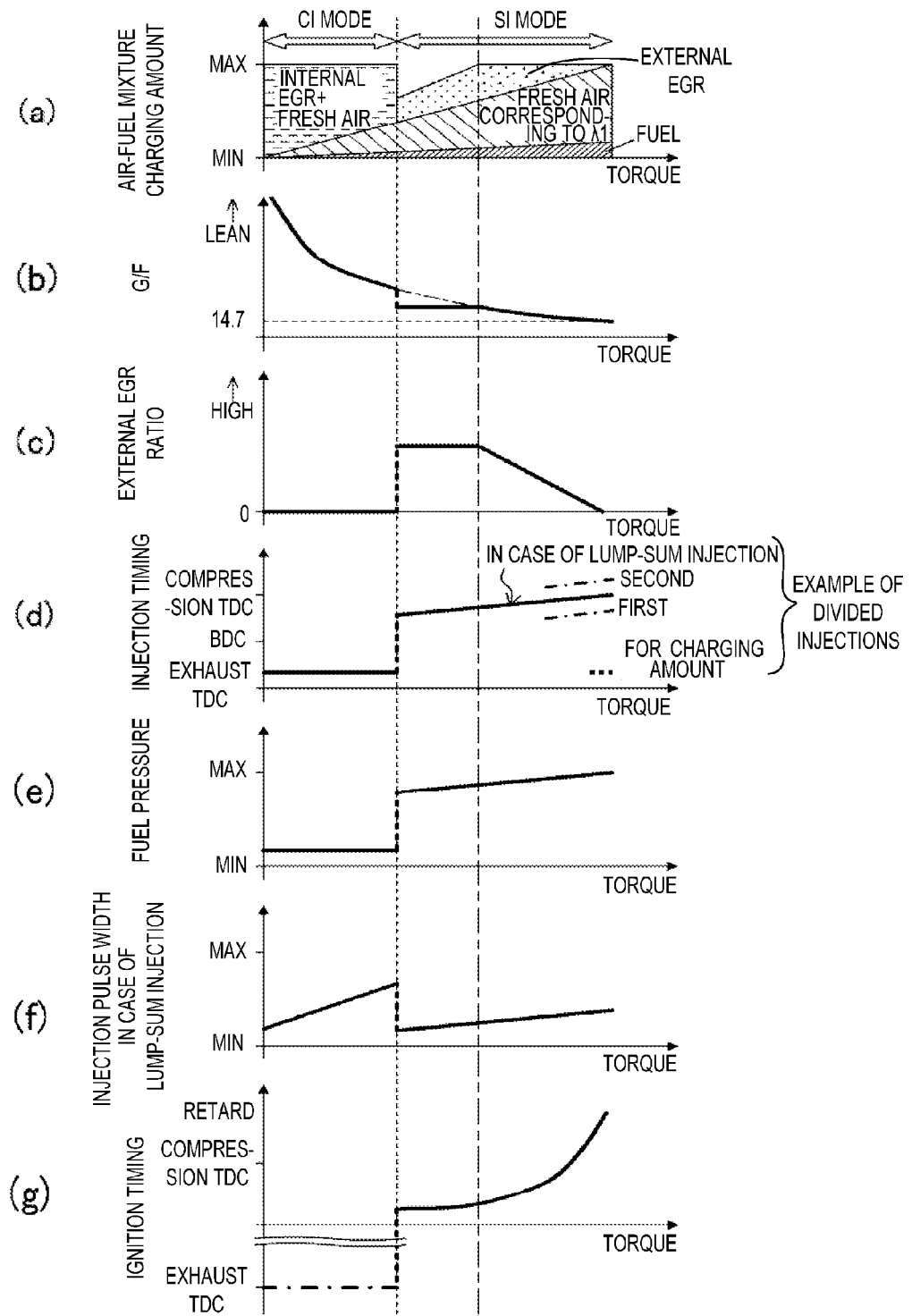
FIG. 14 is charts showing an example of changes of (a) the air-fuel mixture charging amount, (b) a G/F, (c) an external EGR ratio, (d) the injection timing, (e) a fuel pressure, (f) an injection pulse width, and (g) the ignition timing according to the change of the engine load.

Next, FIG. 14 shows changes of the respective control parameters of the engine 1 according to the variation in engine load within the low engine speed range, that are: (b) G/F, (c) the external EGR ratio, (d) the injection timing, (e) the fuel pressure, (f) a fuel injection pulse width (i.e., injection period), and (g) the ignition timing θ ig.

First, the state of the air-fuel mixture inside the cylinder becomes a state as shown in part (a) of FIG. 14. Therefore, as shown in part (b) of FIG. 14, in the CI mode, the G/F changes from lean to, by gradually approaching, the theoretical air-fuel ratio according to the increase of the fuel amount and, in the SI mode, within the switching range, the G/F is constant at a predetermined value because the charging amount of the air-fuel mixture is decreased as described above, whereas, within the range where the engine load is higher than the switching range, the G/F gradually decreases corresponding to the increase of the engine load, and the G/F=14.7 when the engine load is at the maximum.

Part (c) in FIG. 14 shows the external EGR ratio. As described above, the external EGR ratio is zero in the CI mode and is at the maximum value within the switching range of the SI mode. As described above, in the SI mode, because combustion stability is secured by the high pressure retarded injection, the large amount of EGR gas can be introduced into the cylinder 18. Therefore, here, the EGR ratio may suitably be set to about 30 to 50%, which is a value higher than the maximum EGR ratio with the conventional SI combustion (about 20%). Within the range where the engine load is higher than the switching range, the EGR ratio gradually reduces as the engine load increases so as to be zero again when the engine is fully loaded. That is, even in the SI mode, the external EGR control is stopped when the engine is fully loaded.

As shown in part (d) of FIG. 14, in the CI mode, the fuel injection timing is set to be, for example, during the intake stroke between the exhaust top dead center and the intake bottom dead center. The fuel injection timing may be changed according to the engine load. On the other hand, in the SI mode, the fuel injection timing is set to be within the retard period from the later-half stage of the compression stroke to the early stage of the expansion stroke, that is, the high pressure retarded injection. Further, in the SI mode, the injection timing is gradually changed to the retarding side corresponding to the increase of the engine load. This is because, the pressure and temperature inside the cylinder 18 increase corresponding to the increase of the engine load, and thereby, abnormal combustion easily occurs; thus, the injection timing needs to be set to the retarding side so as to effectively avoid abnormal combustion. Here, the solid line in part (d) of FIG. 14 shows an example of the fuel injection timing in the case of performing the lump-sum injection in which the high pressure retarded injection is performed by a single fuel injection. On the other hand, the one-dot chain line in part (d) of FIG. 14 shows an example of the fuel injection timings of the first and second injections in the case where the high pressure retarded fuel injection is divided into two fuel injections: the first injection and the second injection. According to the chart, the second injection in the divided injections is performed on the retarding side compared to the case of the lump-sum injection and, therefore, is further advantageous in avoiding abnormal combustion. This results from securing the time for the vaporization and atomization of the fuel by performing the first injection in the comparatively early stage, and the contracted time length required for the vaporization and atomization of the fuel due to fuel injection amount in the second injection becoming relatively less.

Further, as indicated by the dotted line in part (d) of FIG. 14, within the engine fully loaded range, because the total fuel injection amount increases, the increased amount of fuel may be included in the intake stroke injection to be performed to improve the intake air charging efficiency.

Part (e) in FIG. 14 shows the change of the fuel pressure supplied to the direct injector 67, and in the CI mode, the fuel pressure is set to be constant at the minimum fuel pressure. On the other hand, in the SI mode, the fuel pressure is set to be higher than the minimum fuel pressure and is set to increase corresponding to the increase of the engine load. This is because, due to abnormal combustion easily occurring as the engine load increases, the injection period is required to be further shortened and the injection timing is required to be further retarded.

Part (f) in FIG. 14 shows the change of the injection pulse width (opening period of the injector) corresponding to the injection period in the case of performing the lump-sum injection. In the CI mode, the pulse width widens corresponding to the increase of the fuel injection amount and, similarly in the SI mode, the pulse width widens corresponding to the increase of the fuel injection amount. However, as shown in part (e) of FIG. 14, in the SI mode, the fuel pressure is set significantly higher in the SI mode than in the CI mode, therefore, regardless of the fuel injection amount in the SI mode being larger than that in the CI mode, the pulse width thereof is set shorter than that in the CI mode. This shortens the unburned air-fuel mixture reactable time and is advantageous in avoiding abnormal combustion.

Further, part (g) in FIG. 14 shows the change of the ignition timing θ ig. In the SI mode, in addition to the fuel injection timing being retarded as the engine load increases, the ignition timing θ ig is retarded as the engine load increases as well. This is advantageous in avoiding abnormal combustion. Further, in the CI mode, although the ignition is basically not performed, as indicated by the one-dot chain line in the chart, for example, the ignition may be performed near the exhaust top dead center so as to avoid smoldering of the ignition plug 25.

Figure 15:
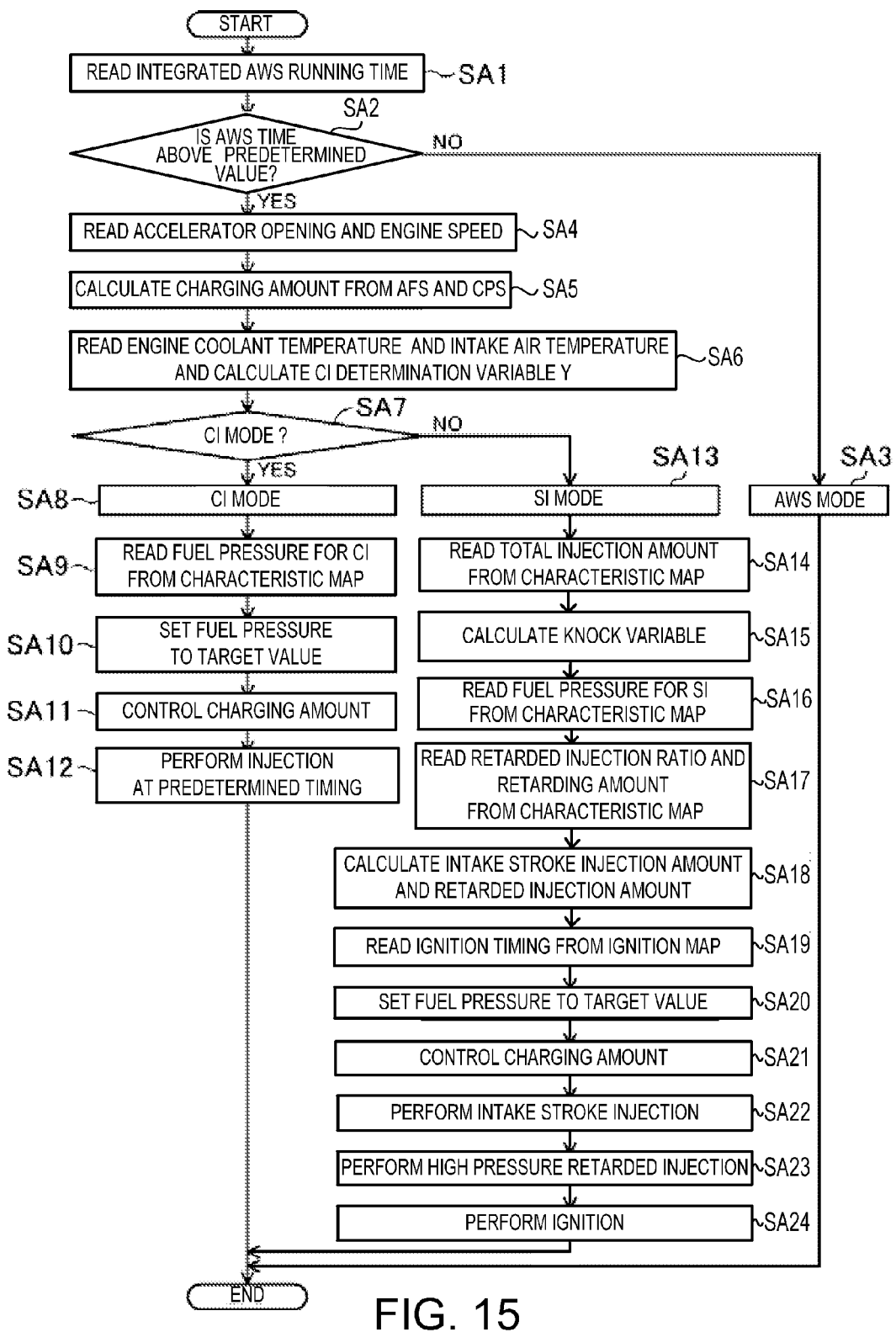
FIG. 15 is a flowchart of an engine control performed by a PCM.

Next, the control of the engine 1 is described in further detail with reference to the flowchart in FIG. 15. The flowchart shows a control flow of the engine 1 that is performed by the PCM 10. By controlling the engine 1 according to the flowchart, the state of the engine 1 according to the variation of the engine load (note that, the surrounding environment is in a steady state) becomes any one of the states shown in FIGS. 12 to 14. Note that, the flow shown in FIG. 15 does not limit the order of performing each operation, and the order shown in the flow of FIG. 15 is an example. Therefore, the order of the operations may suitably be switched in the flow or a plurality of operations may be performed at the same time. Further, any of the operations may suitably be omitted from or other operations may be added in the flow shown in FIG. 15.

First, at Step SA1, an integrated AWS running time is read and, at the following Step SA2, the read AWS running time is determined whether to be above a predetermined value or not. AWS (Accelerated Warm-up System) is a system for speeding up the activation of the catalysts 41 and 42 by increasing the temperature of the exhaust gas when starting the engine 1, and thereby, promoting the purification of the exhaust gas. The AWS runs for a predetermined time length after the engine 1 is started. Therefore, if the result of the determination at Step SA2 is NO (i.e., the AWS running time is below the predetermined value), the control flow proceeds to Step SA3, and the engine is in an AWS mode. In the AWS mode, basically, the SI combustion where the intake air amount is increased and the ignition timing θ ig of the ignition plug 25 is significantly retarded is performed.

On the other hand, if the result of the determination at Step SA2 is YES (i.e., the AWS running time is above the predetermined value), the control flow proceeds to Step SA4. That is, the AWS is stopped and the engine 1 shifts to a normal operation mode.

At Step SA4, the PCM 10 first reads the accelerator opening and the engine speed and, at Step SA5, the PCM 10 calculates the charging amount of the air-fuel mixture based on an intake air flow rate detected by the air flow sensor (AFS) SW1 and the cylinder internal pressure detected by the cylinder internal sensor (CPS) SW6. At Step SA6, the PCM 10 further reads the engine coolant temperature and the temperature of the intake air to be introduced into the cylinder 18. Thereby, a CI determination variable Y is calculated based on the accelerator opening, the engine speed, the charging amount of the air-fuel mixture, the engine coolant temperature, and the intake air temperature.

The CI determination variable Y is calculated from, for example, the equation below, based on each of a function I of the accelerator opening (accelerator opening), a function J of the engine speed (1/engine speed), a function K of the charging amount of the air-fuel mixture (charging amount), a function L of the engine coolant temperature (engine coolant temperature), and a function M of the intake air temperature (intake air temperature).

$$\text{CI determination variable } Y = I(\text{accelerator opening}) + J(1/\text{engine speed}) + K(\text{charging amount}) + L(\text{engine coolant temperature}) + M(\text{intake air temperature})$$

This CI determination variable Y is an index of whether the air-fuel mixture can compression-ignite near the compression top dead center. In other words, the CI determination variable Y determines whether the engine 1 should be operated in the CI mode or SI mode. For example, as shown in FIG. 16A, if the CI determination variable Y is below a first threshold, there is a high possibility for a misfire to occur when the engine is to be operated in the CI mode, therefore, a determination can be performed to change the combustion mode to the SI mode and, on the other hand, if the CI determination variable Y is above a second threshold, there is a high possibility for a pre-ignition to occur when the engine is to be operated in the CI mode, therefore, the determination can be performed to change the combustion mode to the SI mode. Further, if the CI determination variable Y is above the first threshold and below the second threshold, the air-fuel mixture compression-ignites at an appropriate timing near the compression top dead center, therefore, a determination can be performed to change the combustion mode to the CI mode.

Back to the control flow in FIG. 15, at Step SA7, a determination of whether to change to the CI mode is performed based on the CI determination variable Y calculated at Step SA6, and if the result of the determination is YES, the control flow proceeds to Step SA8, and the operation mode of the engine 1 is set to be in the CI mode. On the other hand, if the result of the determination is NO, the control flow proceeds to Step SA13, and the operation mode of the engine 1 is set to be in the SI mode.

In the CI mode, at Step SA9, the fuel pressure (target pressure) for the CI mode is read from a characteristic map that is set in advance and stored in the PCM 10. The characteristic map is set, as an example thereof is shown in FIG. 16B, as a primary function of the engine speed and is set so that the target pressure of the fuel increases as the engine speed increases. The maximum value of the fuel pressure for the CI mode is a predetermined value (FP1).

At the following Step SA10, the high pressure fuel supply system 62 is controlled so that the fuel pressure becomes the target pressure and, at Step SA11, a charging amount control of the air-fuel mixture is performed. The charging amount control includes, as described with reference to FIGS. 12 to 14, at least the control of opening the exhaust valve 22 twice by controlling the VVL 71, and thereby, introduces the internal EGR gas into the cylinder 18. Thereby, at Step SA12, a set predetermined amount of fuel is additionally directly injected into the cylinder 18 through the direct injector 67 at the predetermined timing during the intake stroke or the compression stroke.

As opposed to the CI mode above, in the SI mode, at Step SA14, first a total injection amount (meaning a total amount of the fuel that is injected in one cycle of the engine) is read from a characteristic map that is set in advance and stored in the PCM 10. The characteristic map of the total injection amount is set, as an example thereof is shown in FIG. 16C, as a function of the accelerator opening and is set so that the total injection amount becomes larger as the accelerator opening becomes larger.

At the following Step SA15, a knock variable X is calculated based on the engine speed, the intake air pressure, the intake air temperature, and the total injection amount. The knock variable X is calculated from, for example, the equation below, based on each of a function A of the engine speed (1/engine speed), a function B of the intake air pressure (intake air pressure), a function C of the intake air temperature (intake air temperature), and a function D of the total injection amount (total injection amount).

$$\text{knock variable } X = A(1/\text{engine speed}) + B(\text{intake air pressure}) + C(\text{intake air temperature}) + D(\text{total injection amount})$$

Each of the engine speed, the intake air pressure, the intake air temperature, and the total injection amount is a parameter relating to the generation of knocking and pre-ignition, and the knock variable X is an index of ease of generation of abnormal combustion. That is, abnormal combustion becomes easier to occur as the knock variable X becomes larger and, on the other hand, abnormal combustion becomes harder to occur as the knock variable X becomes smaller. For example, the knock variable X for being directly related to an inverse number of the rotation speed of the engine 1 becomes smaller as the engine speed increases. Further, the knock variable X becomes larger as the total injection amount becomes larger, in other words, as the engine load increases.

Figure 16D:
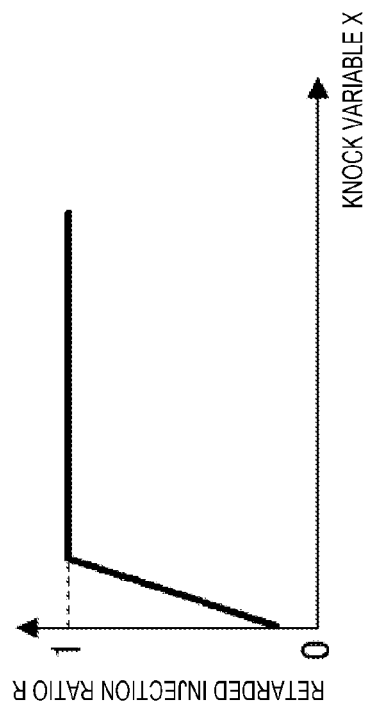

At Step SA16, the fuel pressure (target pressure) for the SI mode is read from a characteristic map that is set in advance and stored in the PCM 10. This characteristic map is set, as an example thereof is shown in FIG. 16D, differing from the fuel pressure for the CI combustion (FIG. 16B), as a primary function of the knock variable and the engine speed (the knock variable and the engine speed), a function G. For example, the target pressure is set higher as the knock variable X becomes higher, which is advantageous in avoiding abnormal combustion as described above. Note that, the minimum value of the fuel pressure for the SI mode (FP2) is set to a pressure higher than the maximum value FP1 of the fuel pressure for the CI combustion. Thereby, the fuel pressure for the SI mode is higher than the fuel pressure for the CI mode at all time.

Figure 16E:
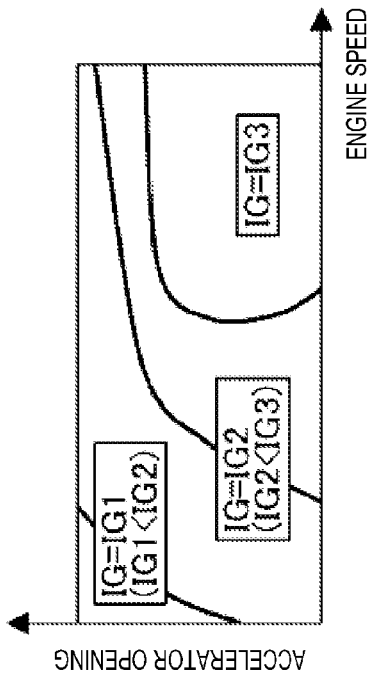
Figure 16F:
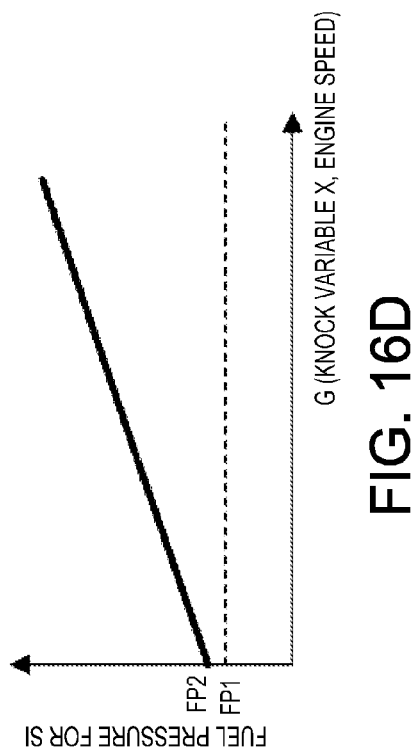

At Step SA17, a retarded injection ratio R and a retarded injection retarding amount T are set based on characteristic maps illustratively shown in FIGS. 16E and 16F, respectively. The retarded injection ratio R is a variable for setting, within the total injection amount, the ratio of the fuel injection amount to be injected within the retard period and the intake stroke injection. The retarded injection ratio R is set larger as the knock variable X becomes larger. Here, as described below, the fuel injection amount by the high pressure retarded injection is calculated from "the total injection amount×the retarded injection ratio" and the fuel injection amount by the intake stroke injection is calculated from "the total injection amount×(1-retarded injection ratio)." Thereby, as the knock variable X becomes larger, the intake stroke injection amount is reduced while the fuel injection amount by the high pressure retarded injection is increased. Further, the retarded injection ratio is a variable within a range of above zero to one. When the retarded injection ratio is one, the entire total injection amount is injected by the high pressure retarded injection and the intake stroke injection is not performed. Here, as shown in FIG. 16E, if the knock variable X is above the predetermined value, because the retarded injection ratio R becomes one, the intake stroke injection amount becomes zero and the intake stroke injection is not performed.

Further, within the middle engine speed range of the engine 1, the retarded injection ratio becomes smaller than one because the knock variable X becomes smaller as the engine speed increases. As a result, as described above, the intake stroke injection is performed within the middle engine speed range of the engine 1 (see part (d) in FIG. 11).

As shown in FIG. 16F, the retarded injection retarding amount T is set larger as the knock variable X becomes larger. In other words, the injection timing of the high pressure retarded injection is set toward the retarding side as the knock variable X becomes larger. As described above, the total injection amount (engine load) and the knock variable X are proportional to each other, therefore, the injection timing of the high pressure retarded injection is set to be more on the retarding side as the engine load increases. Following the retarded fuel injection timing, the ignition timing θ ig is also set to be on the retarding side as the engine load increases. The settings are advantageous in avoiding abnormal combustion.

Figure 16G:
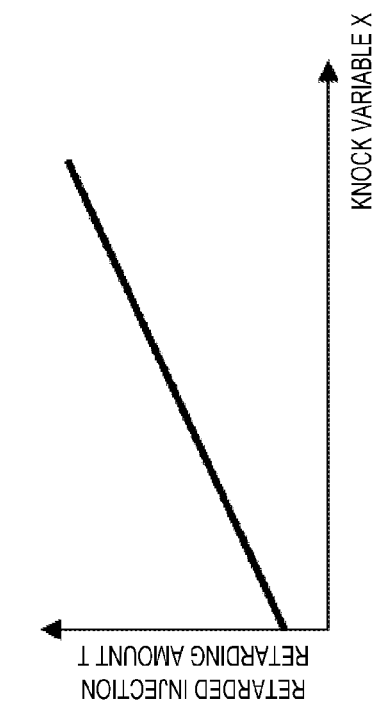

At Step SA18, the fuel injection amount is calculated from the following equations, based on the read retarded injection ratio.

intake stroke injection amount=total injection amount×(1-retarded injection ratio $R$)

high pressure retarded injection amount=total injection amount×retarded injection ratio $R$ At Step SA19, the ignition timing θ ig is read from an ignition map as illustratively shown in FIG. 16G that is set in advance and stored in the PCM 10. This ignition map is a map for setting an ignition timing θ ig (IG) based on the engine speed and the accelerator opening. The ignition timing θ ig is set to be on the retarding side as the engine speed decreases and the accelerator opening increases, in other words, toward upper leftward in the map, and the ignition timing θ ig is set to be on the advancing side as the engine speed increases and the accelerator opening decreases, in other words, toward lower rightward in the map (IG1<IG2<IG3). Note that, here, the ignition timing is set later than the fuel injection timing described above.

Thereby, the target fuel pressure, the fuel injection amount and timing of the high pressure retarded injection, the fuel injection amount and timing for the intake stroke injection when performing the intake stroke injection, and the ignition timing θ ig are set. At the following Step SA20, first the high pressure fuel supply system 62 is controlled so that the fuel pressure reaches the target pressure, and at the next Step SA21, the charging amount of the air-fuel mixture is controlled. The charging amount control is, as shown in FIGS. 12 to 14, in the SI mode where the engine is operated at the air-fuel ratio λ=1, performed to satisfy the air-fuel ratio λ=1 according to the set total injection amount, and in the charging amount control, the control of throttling the intake air to be introduced into the cylinder 18 and/or the control of introducing the external EGR gas into the cylinder 18 is/are performed.

At Step SA22, the intake stroke injection by the set fuel injection amount is performed at the set injection timing. Here, as described above, the fuel is injected into the intake port 16 by the port injector 68. Note that, in the case where the fuel injection amount of the intake stroke injection is set to be zero, Step SA22 is substantially omitted.

At Step SA23, the high pressure retarded injection by the set fuel injection amount is performed at the set injection timing. Therefore, the injection timing is within the retard period from the late stage of the compression stroke to the early stage of the expansion stroke, and the fuel is directly injected into the cylinder 18 by the direct injector 67. Note that, the high pressure retarded injection may be, as described as above, the divided injections including the two fuel injections, the first and second injections, that are performed within the retard period, for example, according to the fuel injection amount. Thereby, at Step SA24, the ignition by the ignition plug 25 is performed at the set ignition timing θ ig.

As above, the SI combustion by the high pressure retarded injection has high combustion stability; even when the large amount of EGR gas is introduced into the cylinder 18, combustion stability can be secured. As a result, as shown in, for example, part (a) of FIG. 14, the engine load control can be achieved within the high and middle engine load ranges by adjusting the amount of fresh air with only the external EGR control. In other words, the switching range where the control of reducing the charging amount of the air-fuel mixture is narrowed as much as possible (a space between the broken line and the one dot chain line in, for example, FIG. 14 is narrowed). Therefore, the SI combustion by the high pressure retarded injection is advantageous in reducing the pumping loss. Further, the introduction of the large amount of EGR gas is advantageous in reducing the cooling loss, avoiding abnormal combustion within the high engine load range, and suppressing the generation of Raw NOx.

Moreover, within the switching range, although the control of reducing the charging amount of air-fuel mixture is needed, the large amount of EGR gas is introduced into the cylinder, therefore, the throttled amount of fresh air correspondingly reduces. The reduced throttled amount of fresh air is also advantageous in reducing the pumping loss.

Note that, in the above configuration, as it is clear from, for example, FIG. 12, the switch between the CI and SI modes is synchronized with performing and stopping the control of opening the exhaust valve 22 twice. In other words, when the operating state of the engine 1 is within either one of the low and middle engine load range of the low engine speed range and the combustion ignition combustion is performed, the internal EGR gas is surely introduced into the cylinder 18. Whereas, when the operating state of the engine 1 is within the middle engine load range of the low engine speed range, the CI mode may be performed while control of opening the exhaust valve 22 twice is stopped and the internal EGR is stopped. That is, when the operating range of the engine 1 is within the middle engine load range of the low engine speed range, the compression-ignition combustion may be performed without introducing the internal EGR gas into the cylinder 18. In other words, in view of avoiding the temperature inside the cylinder 18 from increasing excessively and securing the required amount of fresh air, in the CI mode where the compression-ignition combustion is performed, the internal EGR is stopped at a predetermined engine load (middle engine load) in the above configuration, meanwhile, the range where the compression-ignition combustion is performed may be enlarged to the high engine load side.

Further, the port injector 68 and the low pressure fuel supply system 66 may be omitted and the intake stroke injection may be performed by the direct injector 67.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE NUMERALS

1 Engine (Engine Body)
10 PCM (Controller)
18 Cylinder
25 Ignition Plug
30 Intake Passage
36 Throttle Valve
50 EGR Passage
62 High Pressure Fuel Supply System (Fuel Pressure Variable Mechanism)
67 Direct Injector (Fuel Injection Valve)

The invention claimed is:

1. A control device of a spark-ignition gasoline engine, comprising:
an engine body having a cylinder of which a geometric compression ratio is set to 14:1 or above, and being supplied with fuel containing at least gasoline;
a fuel injection valve for injecting the fuel into the cylinder;
an ignition plug arranged to be oriented inside the cylinder and for igniting an air-fuel mixture within the cylinder;
a fuel pressure variable mechanism for changing a pressure of the fuel that is injected by the fuel injection valve; and
a controller for operating the engine body by controlling at least the fuel injection valve, the ignition plug, and the fuel pressure variable mechanism,
wherein when an operating state of the engine body is within a predetermined low engine load range, the controller sets a combustion mode to a compression-ignition mode in which a compression-ignition combustion is performed,
wherein when the operating state is within a high engine load range where an engine load is higher than the compression ignition mode, the controller sets the combustion mode to a spark-ignition mode in which the controller controls the fuel pressure variable mechanism so that the fuel pressure is higher than that within a lower-half engine load range of the compression-ignition mode, the controller also operates the fuel injection valve to perform at least a fuel injection during a retard period from a late stage of compression stroke to an early stage of expansion stroke, and the controller also operates the ignition plug to ignite during the retard period and after the fuel injection,
wherein when the operating state is within a range where the engine load is higher than a predetermined engine load of the spark-ignition mode, the controller performs an external EGR control of circulating a part of the burned gas back to an intake system of the engine body through an EGR passage, and the controller also controls an EGR ratio to be relatively high when the engine load is low in the spark-ignition mode, and
wherein when the operating state is within a range where the engine load is below the predetermined load of the spark-ignition mode, the controller performs the external EGR control while setting the EGR ratio higher than that within the range where the engine load is higher than the predetermined engine load, and also performs a charging amount control of reducing an intake air charging amount to be less than in the compression-ignition mode.

2. The control device of claim 1, wherein in the spark-ignition mode, the controller operates the engine body at an air-fuel ratio $\lambda=1$.

3. The control device of claim 1, wherein in the spark-ignition mode, the fuel pressure variable mechanism sets the fuel pressure to 40 MPa or above.

4. The control device of claim 1, wherein within the range where the engine load is below the predetermined engine load of the spark-ignition mode, the controller sets the EGR ratio to 30% or above.

5. The control device of claim 1, wherein in the spark-ignition mode, the controller operates the fuel injection valve to perform a plurality of fuel injections and sets a timing of the final fuel injection among the plurality of fuel injections to be during the retard period.

6. The control device of claim 1, wherein within the range where the engine load is below the predetermined engine load of the spark-ignition mode, the controller adjusts the EGR ratio by performing a throttle control of a throttle valve that is provided within an intake passage.

7. The control device of claim 1, further comprising a variable valve mechanism (VVL) for changing an actuation state of an exhaust valve, wherein in the compression-ignition mode, the controller adjusts the EGR ratio by opening the exhaust valve twice during an exhaust stroke and an intake stroke, respectively.

8. The control device of claim 1, wherein in the compression-ignition mode (CI), a ratio of an amount of fresh air and an amount of EGR gas is adjusted by fully opening a throttle valve that is provided within an intake passage, fully closing an EGR valve that is provided within the EGR passage, setting closing timings of an exhaust valve and an intake valve to predetermined constant timings, respectively, advancing an opening timing of the intake valve as the engine load increases, and increasing a lift of the intake valve corresponding to an increase of the engine load.

9. The control device of claim 1, wherein in the spark-ignition mode (SI), a ratio of an amount of fresh air and an amount of EGR gas is adjusted by keeping a throttle valve provided within an intake passage fully opened, setting opening and closing timings of an intake valve constant, keeping a lift of the intake valve at a maximum value, and adjusting an opening of an EGR valve that is provided within the EGR passage.

10. The control device of claim 1, wherein in the compression-ignition mode (CI), a ratio of an amount of fresh air and an amount of EGR gas is adjusted by increasing an opening of a throttle valve that is provided within an intake passage corresponding to an increase of the engine load, fully closing an EGR valve that is provided within the EGR passage, setting closing timings of an exhaust valve and an intake valve to a predetermined constant timings, respectively, setting an opening timing of the intake valve to be constant regardless of the engine load, and setting a lift of the intake valve to be constant regardless of the engine load.

11. The control device of claim 1, wherein in the spark-ignition mode (SI), a switching range is set within a middle engine load range relating to a switch to the compression-ignition mode, and wherein within the switching range, a ratio of an amount of fresh air and an amount of EGR gas is adjusted by throttling a throttle valve that is provided within an intake passage rather than a fully opened state, fully opening an EGR valve that is provided within the EGR passage, retarding a closing timing of an intake valve as the engine load increases, setting an opening timing of the intake valve and a closing timing of an exhaust valve constant, and keeping a lift of the intake valve at a maximum value.

12. The control device of claim 1, wherein the controller calculates a knock variable and then calculates the fuel pressure in the spark-ignition mode (SI) based on the knock variable.

13. The control device of claim 1, wherein the controller calculates a knock variable and then calculates a ratio of the fuel injection during the retard period of the spark-ignition mode (SI) to a total injection amount based on the knock variable.

14. The control device of claim 1, wherein the controller calculates a knock variable and then calculates a retarding amount of an injection timing in the spark-ignition mode (SI) based on the knock variable.

15. The control device of claim 1, wherein the controller determines to switch the combustion mode to either one of the compression-ignition mode and the spark-ignition mode based on a determination variable that is calculated from an accelerator opening, an engine speed, a charging amount of intake air, an engine coolant temperature, and an intake air temperature.

16. A method of controlling a spark-ignition gasoline engine including an engine body having a cylinder of which a geometric compression ratio is set to 14:1 or above, and being supplied with fuel containing at least gasoline, a fuel injection valve for injecting the fuel into the cylinder, an ignition plug arranged to be oriented inside the cylinder and for igniting air-fuel mixture within the cylinder, and a fuel pressure variable mechanism for changing a pressure of the fuel that is injected by the fuel injection valve, the engine operating the engine body by controlling at least the fuel injection valve, the ignition plug, and the fuel pressure variable mechanism, the method comprising:

setting, when an operating state of the engine body is within a predetermined low engine load range, a combustion mode to a compression-ignition mode in which a compression-ignition combustion is performed;

setting, when the operating state is within a high engine load range where an engine load is higher than the compression ignition mode, the combustion mode to a spark-ignition mode in which the controller controls the fuel pressure variable mechanism so that the fuel pressure is higher than that within a lower-half engine load range of the compression-ignition mode, also operating the fuel injection valve to perform at least a fuel injection during a retard period from a late stage of compression stroke to an early stage of expansion stroke, and also operating the ignition plug to ignite during the retard period and after the fuel injection;

performing, when the operating state is within a range where the engine load is higher than a predetermined engine load of the spark-ignition mode, an external EGR control of circulating a part of the burned gas back to an intake system of the engine body through an EGR passage, and also controlling an EGR ratio to be relatively high when the engine load is low in the spark-ignition mode; and performing, when the operating state is within a range where the engine load is below the predetermined engine load of the spark-ignition mode, the external EGR control while setting the EGR ratio higher than that within the range where the engine load is higher than the predetermined engine load, and also a charging amount control of reducing an intake air charging amount to be less than in the compression-ignition mode.

* * * * *